(12) United States Patent
Ueyama

(10) Patent No.: US 10,759,471 B2
(45) Date of Patent: Sep. 1, 2020

(54) POWER STEERING DEVICE

(71) Applicant: TOYOTA JIDOSHA KABUSHIKI KAISHA, Toyota-shi, Aichi (JP)

(72) Inventor: Masao Ueyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 15/986,259

(22) Filed: May 22, 2018

(65) Prior Publication Data

US 2018/0339727 A1    Nov. 29, 2018

(30) Foreign Application Priority Data

May 29, 2017    (JP) ................................ 2017-105772

(51) Int. Cl.
| | | |
|---|---|---|
| *B62D 5/04* | (2006.01) | |
| *B62D 5/12* | (2006.01) | |
| *B62D 5/06* | (2006.01) | |
| *B62D 6/02* | (2006.01) | |
| *B62D 5/065* | (2006.01) | |

(52) U.S. Cl.
CPC ......... *B62D 5/0463* (2013.01); *B62D 5/0409* (2013.01); *B62D 5/064* (2013.01); *B62D 5/065* (2013.01); *B62D 5/12* (2013.01); *B62D 6/02* (2013.01)

(58) Field of Classification Search
CPC .... B62D 5/0463; B62D 5/0409; B62D 5/064; B62D 5/065
See application file for complete search history.

(56) References Cited

U.S. PATENT DOCUMENTS 5,743,351 A * 4/1998 McLaughlin ........ B62D 5/0463
                                                                180/446
6,008,599 A * 12/1999 Beck .................... B62D 5/0463
                                                                180/446

(Continued)

FOREIGN PATENT DOCUMENTS

| CN | 106043419 | * 10/2016 |
| CN | 106043419 A | 10/2016 |

(Continued)

OTHER PUBLICATIONS

Aug. 27, 2019 Office Action issued in Japanese Patent Application No. 2017-105772.

*Primary Examiner* — Joseph M Rocca
*Assistant Examiner* — Michael R Stabley
(74) *Attorney, Agent, or Firm* — Oliff PLC

(57) ABSTRACT

The power steering device is configured to: apply a required assist force only from a first electric motor until a predetermined period elapses, which is a period from a time point at which a driver starts steering to a time point at which a second-electric-motor drive start condition, which is a condition for starting drive of a second electric motor, is satisfied; when the predetermined period has elapsed, apply the required assist force from the first electric motor and a hydraulic actuator; and adjust an assist force by the first electric motor so that the assist force by the first electric motor is a value obtained by subtracting an assist force by the hydraulic actuator from the required assist force. As a result, the device can be downsized, and a sufficient required assist force can be generated from an initial stage of the steering.

6 Claims, 16 Drawing Sheets

(56) References Cited

U.S. PATENT DOCUMENTS

| | | | | |
|---|---|---|---|---|
| 6,122,912 A | * | 9/2000 | Phillips | B62D 5/065 60/413 |
| 7,004,279 B2 | * | 2/2006 | Shitamitsu | B62D 5/003 180/402 |
| 7,642,738 B2 | * | 1/2010 | Hamada | B62D 5/0496 318/432 |
| 7,860,624 B2 | * | 12/2010 | Kubota | B62D 5/0463 180/443 |
| 8,874,316 B2 | * | 10/2014 | Kariatsumari | B62D 5/0463 180/443 |
| 8,930,078 B2 | * | 1/2015 | Nishimori | B62D 6/00 701/41 |
| 9,022,167 B2 | * | 5/2015 | Park | B62D 5/065 180/405 |
| 2007/0043490 A1 | | 2/2007 | Yokota et al. | |
| 2011/0010052 A1 | | 1/2011 | Limpibuntemg et al. | |

FOREIGN PATENT DOCUMENTS

| | | |
|---|---|---|
| JP | 2007-55276 A | 3/2007 |
| JP | 2008-62699 A | 3/2008 |
| JP | 2008-260329 A | 10/2008 |
| JP | 2009-248643 A | 10/2009 |
| JP | 2010-143242 A | 7/2010 |
| JP | 2010-247579 A | 11/2010 |

* cited by examiner

POWER STEERING DEVICE

BACKGROUND OF THE INVENTION

1. Field of the Invention

The present invention relates to a power steering device configured to apply a steering assist force (hereinafter sometimes simply referred to as "assist force" or "assist torque") to a steering mechanism.

2. Description of the Related Art

Hitherto, there has been known a power steering device (hereinafter referred to as "conventional device") capable of applying to a steering mechanism an assist force for assisting an operation (hereinafter also referred to as "steering") on a steering wheel from both an electric assist motor and a hydraulic actuator. This hydraulic actuator is operated by acting of hydraulic fluid supplied from an electric hydraulic pump.

When a required assist force is smaller than a predetermined value, the conventional device does not operate the electric hydraulic pump, and generates the assist force only by the electric assist motor. Further, when the required assist force is larger than the predetermined value, the conventional device operates the electric hydraulic pump in addition to the electric assist motor, to thereby generate the assist force both from the electric assist motor and the hydraulic actuator (for example, refer to Japanese Patent Application Laid-open (Kokai) No. 2008-260329 (FIG. 4)). As a result, when the assist force generated only by the drive of the electric assist motor is insufficient, an insufficient amount of the assist force can be compensated for by the assist force generated by the hydraulic actuator. Thus, it is considered that a small motor capable of generating a relatively small maximum torque can be employed as the electric assist motor.

However, the conventional device continues to cause the electric assist motor to generate "an assist force generated when the required assist force is the predetermined value" when the required assist force is larger than the predetermined value. Further, the conventional device causes the hydraulic actuator to generate the insufficient amount of the required assist force.

Thus, with the conventional device, a state in which a load on the electric assist motor is high continues, and the electric assist motor may thus overheat. As a conventional device is required to employ a relatively large electric motor (motor that is less likely to overheat even when the motor continues to generate a relatively high torque) capable of generating a high torque as the electric assist motor, and hence there is a problem in that the entire power steering device cannot be downsized.

SUMMARY OF THE INVENTION

The present invention is made to solve the problem mentioned above. That is, one of objects of the present invention is to provide a power steering device, which is downsized and capable of sufficiently generating a required assist force from an initial stage of the steering.

Thus, a power steering device (hereinafter referred to as "present invention device") according to the present invention includes a steering mechanism (20, 30), a first steering assist mechanism (40), a second steering assist mechanism (50), and a control unit (70). The steering mechanism includes a steering wheel (11) and a steering shaft (20) coupled to the steering wheel, and is configured to steer steered wheels (FW1, FW2) of a vehicle in response to an operation on the steering wheel by a driver of the vehicle. The first steering assist mechanism includes a first electric motor (44) assembled to the steering mechanism so as to be capable of transmitting a torque to the steering mechanism, and is configured to apply a first assist force (Ta1) for assisting steering of the steered wheels based on the operation on the steering wheel to the steering mechanism by driving of the first electric motor. The second steering assist mechanism includes a hydraulic pump (53) configured to discharge hydraulic fluid when being driven, a second electric motor (54) configured to drive the hydraulic pump, and a hydraulic actuator (55) configured to operate by acting of the hydraulic fluid discharged from the hydraulic pump, and is configured to apply a second assist force (Ta2) for assisting the steering of the steered wheels based on the operation on the steering wheel to the steering mechanism by operating of the hydraulic actuator. The control unit is configured to determine a required assist force (Ta*) based on the operation on the steering wheel, and to control the first electric motor and the second electric motor so that a resultant force of the first assist force and the second assist force corresponds to the required assist force.

For example, the first steering assist mechanism transmits output (rotational force) of the first electric motor to the steering mechanism (rack and pinion mechanism) though a speed reduction mechanism, to thereby apply the assist force. The first steering assist mechanism configured in this way can always generate the assist force, and a response lag in the assist force thus does not occur in the initial stage of the steering. Meanwhile, particularly when the first steering assist mechanism is provided together with the second steering assist mechanism, a relatively small electric motor is used for the first steering assist mechanism due to a need for downsizing. Therefore, the first steering assist mechanism cannot generate a large assist force required in a low-speed travelling, steering without driving, and the like.

In contrast, the second steering assist mechanism drives the hydraulic pump by using the output (rotational force) of the second electric motor, for example, to thereby pressure-feed the hydraulic fluid reserved in a tank to cylinder chambers of a power cylinder via a control valve. As a result, the second steering assist mechanism applies a force of pushing a piston of the power cylinder configured to translate together with a rack shaft. The second steering assist mechanism configured in this way can generate a large assist force required in the low-speed travel, the steering without driving, and the like. However, the second steering assist mechanism is configured to generate the assist force only when the steering is carried out in consideration of influence on a fuel efficiency. Specifically, the second electric motor is stopped when the steering is not carried out, and is driven when the steering is carried out (for example, when a steering torque equal to or higher than a predetermined value is generated). The hydraulic pump requires time to generate a predetermined hydraulic pressure from when the drive is started by the output of the second electric motor, and a response lag in the assist force thus occurs in the initial stage of the steering.

In view of this, the control unit is configured to: stop drive of the first electric motor and stop drive of the second electric motor when the required assist force is zero; drive the first electric motor so that the first assist force corresponds to the required assist force with the drive of the second electric motor being stopped in a period from a first time point (t10) at which a magnitude of the required assist force starts increasing from zero to a second time point (t11) at which a predetermined specific condition is determined to be satisfied; and start the drive of the second electric motor (Step 850) at the second time point, to thereby increase the second assist force as time elapses, and drive the first electric motor (Step 835) after the second time point so that the first assist force corresponds to a value obtained by subtracting the second assist force from the required assist force, to thereby decrease the first assist force as time elapses.

With this configuration, the control unit of the present invention device applies the assist force corresponding to the required assist force to the steering mechanism by the first electric motor (namely, the first steering assist mechanism) in the steering initial stage (from the first time point to the second time point at which the predetermined specific condition is determined to be satisfied), in which the assist (namely, the assist by the second steering assist mechanism) by the hydraulic actuator cannot follow. When the second-electric-motor drive start condition is satisfied (the predetermined specific condition is satisfied), the assist force (namely, the assist force by the second steering assist mechanism) by the hydraulic actuator is generated, and this assist force gradually increases as the pressure inside the hydraulic pump increases (as the time elapses). The control unit adjusts (decreases as the time elapses) the assist force by the first electric motor so that the assist force (first assist force) by the first electric motor corresponds to the value obtained by subtracting the assist force (second assist force) by the hydraulic actuator from the required assist force.

In this way, the present invention device uses the first steering assist mechanism without the response lag to assist the steering in the steering initial stage, in which the required assist force is relatively small, and uses the second steering assist mechanism capable of generating a relatively large assist force in a steering later stage, in which the required assist force is relatively large. With this configuration, the present invention device is not required to continue the assist by the first electric motor until the end of the steering unlike the conventional device. In other words, the present invention device is not required to continue to supply current to the first electric motor until the end of the steering. Thus, a rating required for the first electric motor is small, and the first electric motor can thus be downsized. As described above, with the present invention device, a power steering device that has a small size and can sufficiently generate the required assist force from the steering initial stage can be implemented.

In one of the embodiments of the power steering device according to the present invention, the control unit is configured to determine (Step 815) that the predetermined specific condition is satisfied when a magnitude of a steering torque generated in the steering shaft by the operation on the steering wheel changes from a magnitude lower than a threshold steering torque (Tth) to a magnitude equal to or higher than the threshold steering torque.

For example, as the magnitude of the steering torque generated when the driver operates the steering wheel increases, the magnitude of the required assist torque increases. In a range in which the magnitude of the steering torque is relatively low, the required assist force is equal to or lower than the maximum assist torque that can be generated by the first electric motor, and can thus be generated only by the first electric motor. On the other hand, in a range in which the magnitude of the steering torque is relatively high, the required assist force cannot be generated only by the first electric motor, and the assist force generated by the hydraulic actuator is thus also required. Incidentally, the magnitude of the steering torque presents a tendency of gradually increasing from zero when the steering is started. Thus, in the above-mentioned embodiments, the present invention device is capable of generating the assist force only by the first electric motor in the steering initial stage (from the start of the steering until the predetermined specific condition is satisfied), and generating the assist force by the hydraulic actuator after the predetermined specific condition is satisfied.

In one of the embodiments of the power steering device according to the present invention, the control unit is configured to determine (Step 815A, Step 815B, Step 815C) that the predetermined specific condition is satisfied when a steering speed indication amount, which is one of a magnitude ($|\omega h|$) of a steering speed being a rotational speed of the steering wheel, a magnitude ($|Yr|$) of a yaw rate of the vehicle, and a magnitude ($|Gy|$) of a lateral acceleration of the vehicle, changes from an amount less than a predetermined threshold indication amount ($\omega$hth, Yrth, Gyth) to an amount equal to or more than the predetermined threshold indication amount.

For example, when the steering speed, which is the speed of the operation of the steering wheel by the driver, is relatively low, a final steering angle (hereinafter also referred to as "target steering angle") is assumed to be small. When the target steering angle is small, for example, the vehicle is considered to travel on a gentle curve or change a lane during a medium or high speed travel. Further, when the steering speed is relatively low, a yaw rate and a lateral acceleration generated as a result of turning of the vehicle by the steering are assumed to be relatively low. The yaw rate and the lateral acceleration in addition to the steering speed itself are referred to as "steering speed indication amounts". For example, in most cases, the assist by the hydraulic actuator is not required for the travel on a gentle curve or the lane change, and the assist only by the first electric motor is sufficient. Thus, according to the embodiment, the present invention device stops the drive of the second electric motor when "the steering speed indication amount" is less than the threshold indication amount. As a result, the second electric motor is driven less often, which is effective for improvement of the fuel efficiency.

In one of the embodiments of the power steering device according to the present invention, the control unit is configured to set (refer to FIG. 10) the predetermined threshold indication amount based on an increase amount ($d|\omega h|/dt$, $d|Yr|/dt$, $d|Gy|/dt$) per unit time of the steering speed indication amount so that the predetermined threshold indication amount decreases as the increase amount increases.

According to the embodiment, the present invention device carries out the assist only by the first electric motor as much as possible for "gentle steering", in which an increase amount per unit time of the steering speed indication amount is relatively small. Meanwhile, the present invention device generates the assist force by the hydraulic actuator in an early stage for "quick steering", in which an increase amount per unit time of the steering speed indication amount is relatively large. Thus, with the present invention device, a capability of following the required assist force is secured.

In one of the embodiments of the power steering device according to the present invention, the control unit is configured to set the predetermined threshold indication amount in accordance with a temperature (Temp) of the first electric motor so that the predetermined threshold indication amount decreases as the temperature of the first electric motor increases.

According to the embodiment, the present invention device sets a smaller threshold indication amount as the temperature of the first electric motor increases. In other words, the present invention device sets a smaller threshold indication amount as the power consumption of the first electric motor increases, and sets a larger threshold indication amount as the power consumption decreases. Thus, the present invention device can prevent an excessive load from being applied to the first electric motor.

In one of the embodiments of the power steering device according to the present invention, the control unit includes a driving circuit including a semiconductor device configured to control an amount of current supply to the first electric motor, and is configured to set the predetermined threshold indication amount in accordance with a temperature of the semiconductor device so that the predetermined threshold indication amount decreases as the temperature of the semiconductor device increases.

The temperature of the driving circuit including the semiconductor device configured to control the amount of current supply to the first electric motor increases as an average drive current of the first electric motor increases. According to the embodiment, the present invention device sets a smaller threshold indication amount as the temperature of the semiconductor device increases (in other words, the power consumption increases), and sets a larger threshold indication amount as the temperature of the semiconductor device decreases (in other words, the power consumption decreases). Thus, the present invention device can prevent an excessive load from being applied to the first electric motor.

In the description given above, in order to facilitate understanding of the present invention, names and/or reference symbols used in an embodiment of the present invention described below are enclosed in parentheses, and are assigned to elements of the invention corresponding to the embodiment. However, the respective elements of the present invention are not limited to the embodiment defined by the names and/or the reference symbols. Other objects, other features, and accompanying advantages of the present invention are readily understood from a description of the embodiment of the present invention to be given referring to the following drawings.

DESCRIPTION OF THE EMBODIMENTS

First Embodiment (Configuration)

Figure 1:
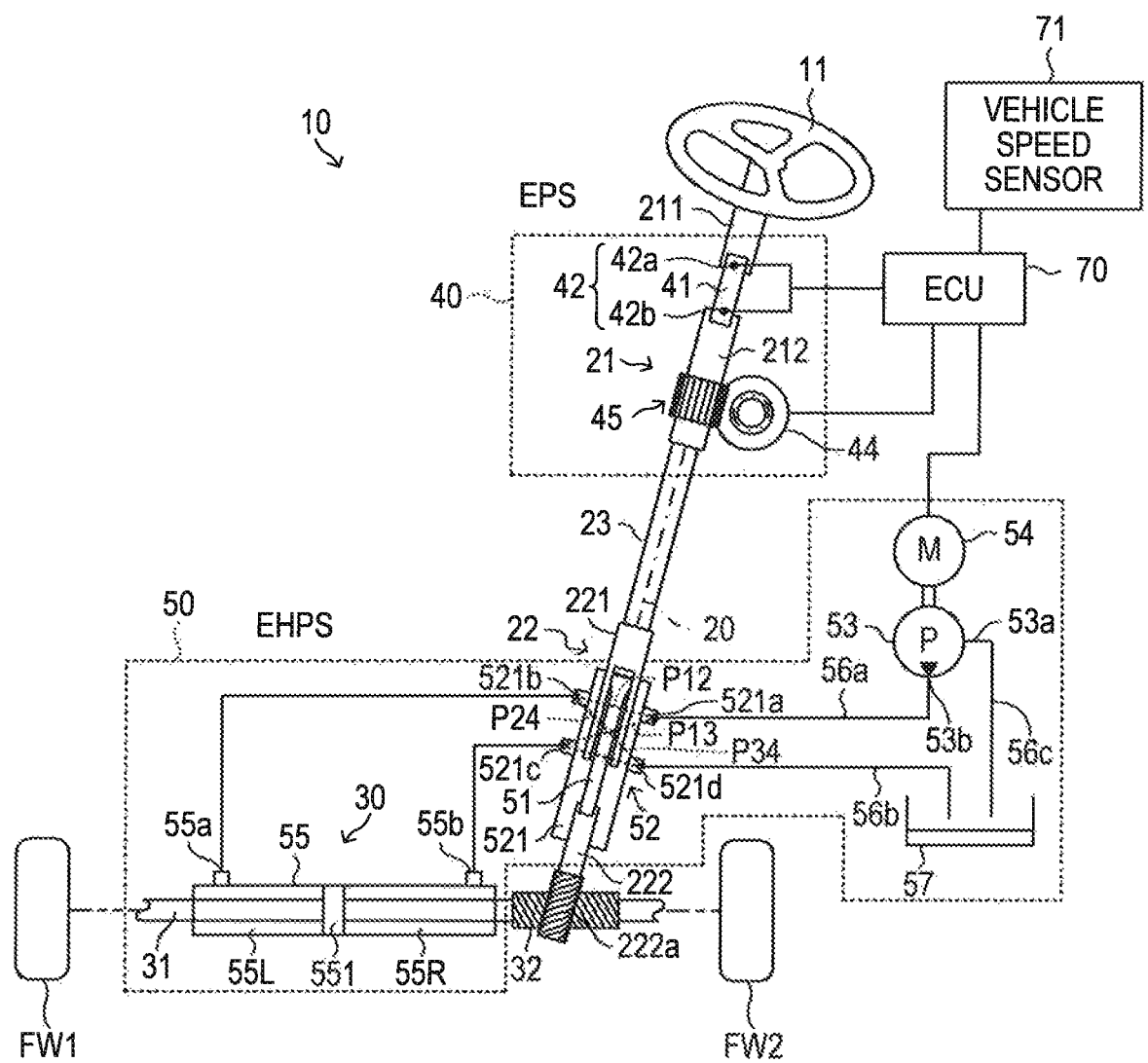
FIG. 1 is a schematic diagram for illustrating a power steering device according to a first embodiment of the present invention.

A power steering device (hereinafter also referred to as "first device") 10 according to a first embodiment of the present invention is applied to a vehicle. As illustrated in FIG. 1, the first device 10 includes a steering wheel 11, a steering shaft 20, and a rack shaft 30. The steering shaft 20 includes a first steering shaft 21, a second steering shaft 22, and an intermediate shaft 23.

The steering wheel 11 is coaxially coupled to one end of the first steering shaft 21 for integral rotation. When a driver carries out an operation (turn operation) on the steering wheel 11, the first steering shaft 21 rotates about an axis. This rotation is transmitted to the second steering shaft 22 via the intermediate shaft 23, and the second steering shaft 22 thus also rotates about an axis. The first steering shaft 21 includes a first shaft 211 and a second shaft 212. A first torsion bar 41 is provided between the first shaft 211 and the second shaft 212.

One end of the first shaft 211 is coupled to the steering wheel 11, and the other end of the first shaft 211 is coupled to one end of the first torsion bar 41. One end of the second shaft 212 is coupled to the other end of the first torsion bar 41, and the other end of the second shaft 212 is coupled to the intermediate shaft 23. The first torsion bar 41 is twisted when the first shaft 211 is rotated as a result of the operation on the steering wheel 11.

An electric power steering device 40 is mounted to the first steering shaft 21. The electric power steering device 40 includes the first torsion bar 41, a pair of torque sensors 42 (42a and 42b) mounted to both ends of the first torsion bar 41, an electric assist motor 44, and a speed reducer 45. The electric power steering device 40 is hereinafter also referred to as "EPS 40" or "first steering assist mechanism 40".

More specifically, the pair of torque sensors 42 are constructed of a first resolver 42a and a second resolver 42b. A twist amount of the first torsion bar 41 is detected based on a difference between a rotation angle $\theta 1$ of the first shaft 211 detected by the first resolver 42a and a rotation angle $\theta 2$ of the second shaft 212 detected by the second resolver 42b. Further, a steering torque T input to the steering wheel 11 is calculated based on the detected twist amount.

The electric assist motor 44 is coupled to the second shaft 212 via the speed reducer 45, and is configured to rotate at a rotation speed in accordance with a control command from a control unit (ECU) 70, which is described later, to thereby generate a rotational driving force. The electric assist motor 44 is also referred to as "first electric motor 44".

The speed reducer 45 is, for example, a worm speed reducer, and is configured to reduce a rotational speed of the electric assist motor 44, and increase a rotational torque thereof. The rotational torque is transmitted from the speed reducer 45 to the second shaft 212 as an assist torque.

The second steering shaft 22 includes an input shaft 221 and an output shaft (hereinafter also referred to as "pinion shaft") 222. A second torsion bar 51 is provided between the input shaft 221 and the output shaft 222.

One end of the input shaft 221 is coupled to the intermediate shaft 23, and the other end of the input shaft 221 is coupled to one end of the second torsion bar 51. One end of the output shaft 222 is coupled to the other end of the second torsion bar 51, and a pinion gear 222a is formed on the other end of the output shaft 222. When a rotational torque is applied from the input shaft 221 to the second torsion bar 51, the second torsion bar 51 is twisted by an amount corresponding to the torque.

The rack shaft 30 includes a shaft part 31. Steered wheels FW1 and FW2 are coupled to both ends of the shaft part 31 via knuckle arms (not shown). A rack part 32 meshing with the pinion gear 222a is formed on the shaft part 31. A rack and pinion mechanism is constructed of the pinion gear 222a and the rack part 32.

A rotational motion of the steering shaft 20 is converted to a linear motion in an axial direction of the rack shaft 30 by the rack and pinion mechanism, and thus the steered wheels FW1 and FW2 are steered. In this way, the steering shaft 20 and the rack shaft 30 construct "a steering mechanism" configured to transmit the operation amount of the steering wheel 11 to the steered wheels FW1 and FW2.

An electric/hydraulic power steering device 50 is mounted to the second steering shaft 22 and the rack shaft 30. The electric/hydraulic power steering device 50 includes the second torsion bar 51, a control valve mechanism 52, a hydraulic pump 53, a hydraulic-pump drive electric motor 54, a power cylinder 55, a main pipe 56a, a reservoir tank 57, and other components. When the rotational torque is applied from the input shaft 221 to the second torsion bar 51, the second torsion bar 51 is twisted by the rotational torque. This twist causes an angular displacement in a rotational direction between the input shaft 221 and a valve sleeve 521, which is described later. The electric/hydraulic power steering device 50 is hereinafter also referred to as "EHPS 50" or "second steering assist mechanism 50".

The control valve mechanism 52 is provided in the main pipe 56a between the hydraulic pump 53 and the power cylinder 55, and internally includes the valve sleeve 521 having a tubular shape, into which the input shaft 221 and the second torsion bar 51 are inserted. The valve sleeve 521 is coupled to the output shaft 222, and is configured to rotate coaxially and integrally with the output shaft 222.

Four ports (a first port 521a, a second port 521b, a third port 521c, and a fourth port 521d) are formed on an outer wall of the valve sleeve 521. Four flow passages configured to cause the four ports to communicate to each other are formed between the valve sleeve 521 and the input shaft 221. A first flow passage P12 causes the first port 521a and the second port 521b to communicate to each other. A second flow passage P13 causes the first port 521a and the third port 521c to communicate to each other. A third flow passage P24 causes the second port 521b and the fourth port 521d to communicate to each other. A fourth flow passage P34 causes the third port 521c and the fourth port 521d to communicate to each other. Further, the first port 521a communicates to a discharge port 53b of the hydraulic pump 53 via the main pipe 56a. The fourth port 521d communicates to the reservoir tank 57 via a drain pipe 56b.

Although not shown, each of opposing surfaces of the valve sleeve 521 and the input shaft 221 is formed into a protruded or recessed shape, and a space between the opposing surfaces in the protruded or recessed shapes communicates to the respective flow passages. An arrangement state between the opposing surfaces in the protruded or recessed shapes is changed by relatively rotating the input shaft 221 with respect to the valve sleeve 521, and, as a result, a flow passage cross sectional area of each of the flow passages changes. In other words, when the input shaft 221 rotates inside the valve sleeve 521 by being transmitted the rotational torque from the first steering shaft 21 side, the second torsion bar 51 is twisted by this rotation. Then, an angular displacement corresponding to an amount of the twist of the second torsion bar 51 is generated between the valve sleeve 521 and the input shaft 221. An inner wall shape of the valve sleeve 521 is formed so that the flow passage cross sectional area of each of the flow passages changes in accordance with the angular displacement amount.

An amount of the hydraulic fluid flowing through each of the flow passages is adjusted as a result of the change in the flow passage cross sectional area. Thus, this state can be considered to be equivalent to a state in which flow rate control valves (hereinafter also simply referred to as "valves") V1, V2, V3, and V4 formed of the valve sleeve 521 and the input shaft 221 are interposed in the respective flow passages (first flow passage P12, second flow passage P13, third flow passage P24, and fourth flow passage P34) (refer to FIG. 2).

The hydraulic pump 53 includes a suction port 53a and the discharge port 53b, and is configured to be rotated by a driving force of the hydraulic-pump drive electric motor 54. The hydraulic pump 53 is configured to suck hydraulic fluid in the reservoir tank 57 from the suction port 53a via a suction pipe 56c, and discharge the sucked hydraulic fluid from the discharge port 53b into the main pipe 56a.

The hydraulic-pump drive electric motor 54 is configured to rotate at a rotation speed in accordance with a control command from the ECU 70, which is described later, to thereby drive the hydraulic pump 53. The hydraulic-pump drive electric motor 54 is also referred to as "second electric motor" 54.

The power cylinder 55 is configured to generate a driving force by being supplied the hydraulic fluid discharged from the hydraulic pump 53 and discharging the hydraulic fluid, and apply the generated driving force to the rack shaft 30. The power cylinder 55 is also referred to as "hydraulic actuator 55". A space in which the hydraulic fluid is filled is formed inside the power cylinder 55. The shaft part 31 is inserted into this space, and the space is partitioned into a left chamber 55L and a right chamber 55R by a power piston 551 mounted to the shaft part 31. Further, a left port 55a communicating to the left chamber 55L and a right port 55b communicating to the right chamber 55R are formed in the power cylinder 55. The left port 55a communicates to the second port 521b of the valve sleeve 521 via the main pipe 56a, and the right port 55b communicates to the third port 521c of the valve sleeve 521 via the main pipe 56a.

Figure 2:
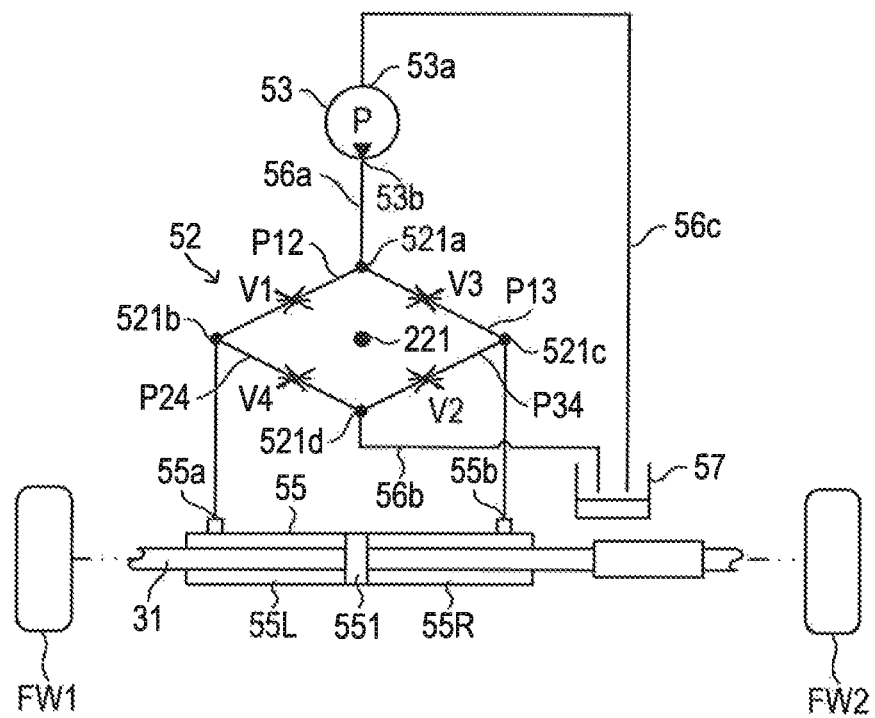
FIG. 2 is a hydraulic circuit diagram for an electric/hydraulic power steering device illustrated in FIG. 1.

As illustrated in FIG. 2, the control valve mechanism 52 is provided between the hydraulic pump 53 and the power cylinder 55. The control valve mechanism 52 is configured as a four-way throttle valve. The control valve mechanism 52 is configured so that a throttle amount of each of the valves (V1, V2, V3, and V4) is changed in accordance with the relative angular displacement amount between the input shaft 221 and the valve sleeve 521 as a result of the operation on the steering wheel 11.

Specifically, when the second torsion bar 51 is twisted by the operation on the steering wheel 11, and positions in the rotational direction of the input shaft 221 and the valve sleeve 521 are thus displaced from each other in one specific direction, the control valve mechanism 52 operates as follows. The valve V1 in the first flow passage P12 configured to cause the first port 521a and the second port 521b to communicate to each other, and the valve V2 in the fourth flow passage P34 configured to cause the third port 521c and the fourth port 521d to communicate to each other are opened. Meanwhile, the valve V3 in the second flow passage P13 configured to cause the first port 521a and the third port 521c to communicate to each other, and the valve V4 in the third flow passage P24 configured to cause the second port 521b and the fourth port 521d to communicate to each other are closed.

Therefore, the hydraulic fluid that has reached the first port 521a from the hydraulic pump 53 mainly flows through the first flow passage P12, on which the valves V1 is opened, and reaches the second port 521b. Then, the hydraulic fluid flows from the second port 521b into the left chamber 55L of the power cylinder 55 via the left port 55a. As a result, the hydraulic fluid from the hydraulic pump 53 is supplied to the left chamber 55L, and a hydraulic pressure is thus generated by the supplied hydraulic fluid, with the result that the power piston 551 receives a pressure from a left side of the drawing sheet. This pressure is transmitted to the shaft part 31, thereby generating a driving force in an axial direction of the shaft part 31, and this driving force is applied to the rack shaft 30 as an assist force.

Meanwhile, when the steering wheel 11 is operated by the application of the assist force, and the shaft part 31 and the power piston 551 move toward the left side of the drawing sheet, the volume of the left chamber 55L of the power cylinder 55 decreases, and the hydraulic fluid in the left chamber 55L is discharged from the left port 55a. The discharged hydraulic fluid enters the second port 521b via the main pipe 56a, reaches the fourth port 521d from the second port 521b via the third flow passage P24, in which the valve is opened, and reaches the reservoir tank 57 from the fourth port 521d via the drain pipe 56b.

All the valves V1, V2, V3, and V4 are configured to be opened when the steering wheel 11 is in a neutral state, in other words, the second torsion bar 51 is not twisted. Thus, in this case, the hydraulic fluid that has flowed from the hydraulic pump 53 to the first port 521a flows both through the flow passage P12 and the flow passage P13. The hydraulic fluid that has reached the second port 521b via the flow passage P12 flows through the flow passage P24, and reaches the fourth port 521d. Meanwhile, the hydraulic fluid that has reached the third port 521c via the flow passage P13 flows through the flow passage P34, and reaches the fourth port 521d. In other words, the hydraulic fluid that has flowed via the second port 521b and the hydraulic fluid that has flowed via the third port 521c merge at the fourth port 521d, and flow to the reservoir tank 57 via the drain pipe 56b. In this way, when the second torsion bar 51 is not twisted, the hydraulic fluid from the hydraulic pump 53 reaches the reservoir tank 57 without flowing through the power cylinder 55.

The ECU is an abbreviated word for an electronic control unit, and is an electronic control circuit including, as a main component, a microcomputer including a CPU, a ROM, a RAM, a backup RAM (or a nonvolatile memory), an interface I/F, and the like. The CPU is configured to execute instructions (routines) stored in the memory (ROM) to implement various functions described later.

The ECU 70 is electrically connected to the electric assist motor 44 and the hydraulic-pump drive electric motor 54. The ECU 70 is electrically connected to the torque sensor 42, the vehicle speed sensor 71, and the like, and is configured to receive output signals from those sensors. As described above, the torque sensor 42 is configured to calculate the steering torque T input to the steering wheel 11, and generate an output signal indicating the steering torque T. The vehicle speed sensor 71 is configured to generate an output signal indicating a travel speed (hereinafter also referred to as "vehicle speed") of the vehicle to which the first device 10 is applied.

(Operation)

A description is now given of an operation of the first device 10. The first device 10 calculates an assist torque to be applied to the steering mechanism (the steering shaft 20 and the rack shaft 30) as a required assist torque Ta*. The required assist torque Ta* is a torque obtained by subtracting a steering torque T generated by being operated the steering wheel 11 by the driver from a torque required to steer the steered wheels FW1 and FW2. The required assist torque Ta* is determined in advance in consideration of, for example, a yaw rate, a lateral acceleration, and the like, which are generated in the vehicle when the vehicle turns, so that the steering torque T is such a torque that the driver can smoothly operate the steering wheel 11.

The first device 10 drives the first electric motor 44 and the second electric motor 54 so that a sum Ta of an assist torque Ta1 applied by the EPS 40 to the steering shaft 20 and an assist torque Ta2 applied by the EHPS 50 to the rack shaft 30 corresponds to the required assist torque Ta*. The assist torque Ta1 applied by the EPS 40 to the steering shaft 20 is hereinafter also referred to as "first assist torque Ta1". The assist torque Ta2 applied by the EHPS 50 to the rack shaft 30 is hereinafter also referred to as "second assist torque Ta2".

Figure 3:
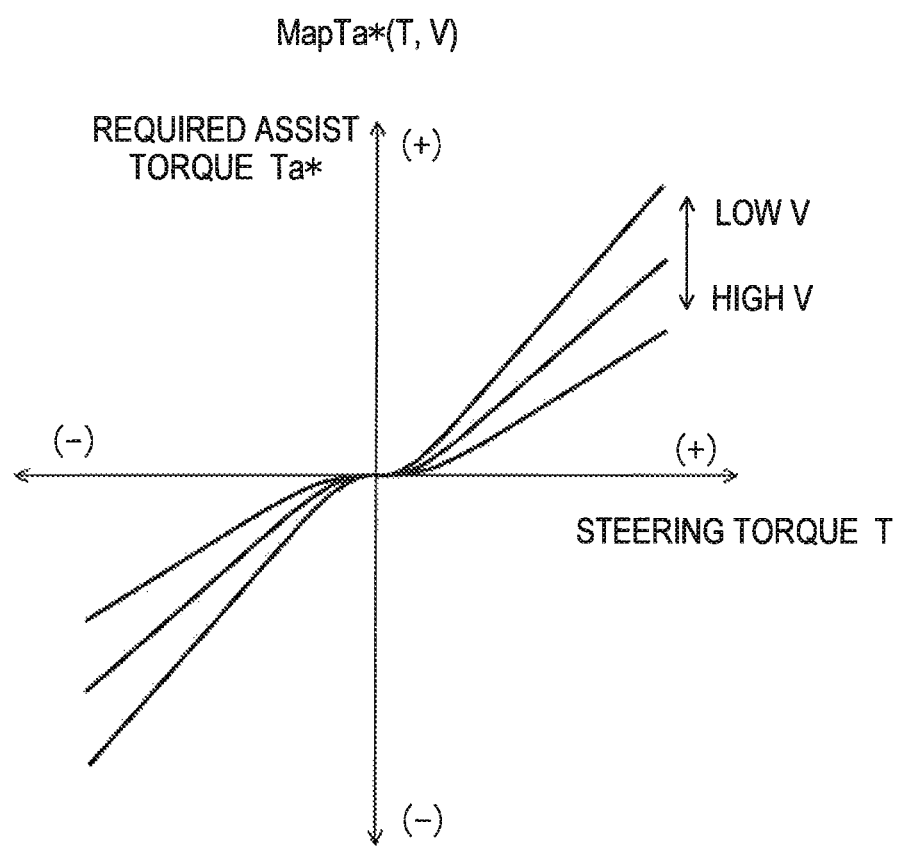
FIG. 3 is a graph for explaining a relationship between a steering torque of the power steering device illustrated in FIG. 1 and a required assist torque.

Referring to FIG. 3, a more specific description is now given of the required assist torque Ta*. In FIG. 3, the steering torque T and the required assist torque Ta* toward a left steering direction are indicated as positive values, and the steering torque T and the required assist torque Ta* toward a right steering direction are indicated as negative values. When the steering torque T is "0", the required assist torque Ta* is "0". When the steering torque T starts increasing from "0" (the steering wheel 11 is rotated toward the left steering direction), a rate (gradient) of an increase in the required assist torque Ta* gradually increases, and the required assist torque Ta* finally increases at an approximately constant rate. On the other hand, when the steering torque T starts decreasing from "0" (the steering wheel 11 is rotated toward the right steering direction), a rate (gradient) of a decrease in the required assist torque Ta* gradually increases, and the required assist torque Ta* finally decreases at an approximately constant rate. The rates of the increase and the decrease in the required assist torque Ta* decrease as the vehicle speed V increases. The relationship among the steering torque T, the vehicle speed V, and the required assist torque Ta* is defined as a lookup table MapTa* (T, V), and is stored in advance in the ROM of the ECU 70. Thus, the actual assist torque Ta* is obtained by applying the acquired steering torque T and vehicle speed V to the lookup table MapTa* (T, V).

Figure 4:
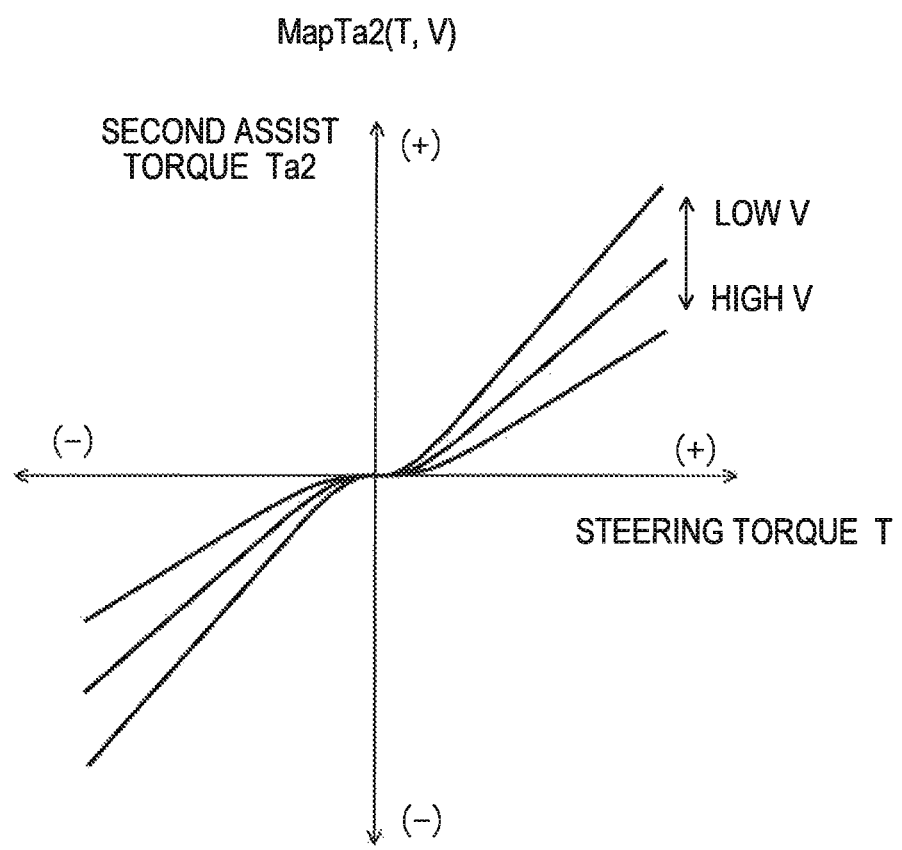
FIG. 4 is a graph for explaining a relationship between the steering torque of the electric/hydraulic power steering device illustrated in FIG. 1 and an assist torque.
Figure 5:
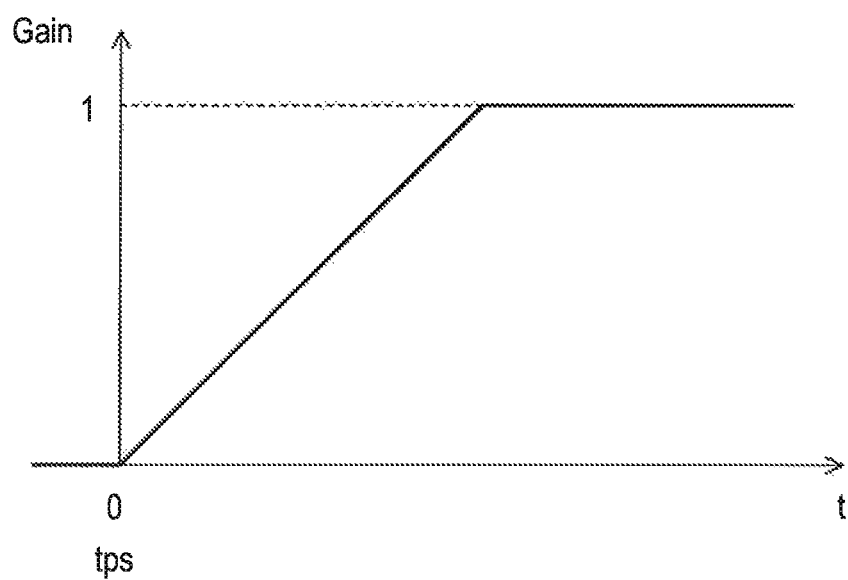
FIG. 5 is a graph for explaining a dynamic gain of the electric/hydraulic power steering device illustrated in FIG. 1.

Next, referring to FIG. 4 and FIG. 5, a description is given of a relationship between the second assist torque Ta2 generated by the second steering assist mechanism (EHPS) 50 and the steering torque T. A change in the second assist torque Ta2 with respect to the steering torque T in a state in which the hydraulic pump 53 is always operating is shown in FIG. 4. In FIG. 4, the steering torque T and the second assist torque Ta2 toward the left steering direction are indicated as positive values, and the steering torque T and the second assist torque Ta2 toward the right steering direction are indicated as negative values. When the steering torque T is "0", the second torsion bar 51 is not twisted, all the valves V1 to V4 of the control valve mechanism 52 are opened, and the second assist torque Ta2 is thus "0".

When the steering torque T starts increasing from "0" (the steering wheel 11 is rotated toward the left steering direction), valve opening degrees (the flow passage cross sectional areas of the first flow passage P12 and the fourth flow passage P34) of the valves V1 and V2 gradually increase, while valve opening degrees (the flow passage cross sectional areas of the second flow passage P13 and the third flow passage P24) of the valves V3 and V4 gradually decrease. Thus, the hydraulic fluid supplied to the left chamber 55L increases, and the hydraulic fluid discharged from the right chamber 55R decreases, Thus, the pressure received by the power piston 551 from the left side of FIG. 2 gradually increases. As a result, a rate (gradient) of an increase in the second assist torque Ta2 gradually increases, and the second assist torque Ta2 finally increases at an approximately constant rate. On the other hand, when the steering torque T starts decreasing from "0" (the steering wheel 11 is rotated toward the right steering direction), a rate (gradient) of a decrease of the second assist torque Ta2 gradually increases, and the second assist torque Ta2 finally decreases at an approximately constant rate. The rates of the increase and the decrease of the second assist torque Tat decrease as the vehicle speed V increases. The above-mentioned characteristic of the second assist torque Ta2 with respect to the steering torque T in a state in which the hydraulic pump 53 is always operating is also referred to as "static characteristic". This static characteristic of the second assist torque Ta2 is stored in advance in the ROM of the ECU 70 as a lookup table MapTa2 (T, V), which defines the relationship among the steering torque T, the vehicle speed V, and the second assist torque Ta2.

The static characteristic of the second assist torque Ta2 corresponds to the characteristic of the required assist torque Ta* shown in FIG. 3. In other words, in the first device 10, the components (the control valve mechanism 52, the hydraulic pump 53, the power cylinder 55, and the like) of the EHPS 50 are designed and control parameters of those components are set so that the second assist torque Ta2 corresponds to the required assist torque Ta*. In short, the first device 10 is configured to basically carry out the steering assist only by the EHPS 50.

However, in actuality, when the steering torque T is "0", in other words, the steering wheel 11 is at a neutral position, the first device 10 stops the second electric motor 54 of the EHPS 50. For example, when a magnitude (absolute value) |T| of the steering torque T changes from a torque lower than a predetermined steering torque (threshold steering torque) Tth to a torque equal to or higher than the threshold steering torque Tth, the first device 10 starts the drive of the second electric motor 54. In this way, the hydraulic pump 53 is driven by the second electric motor 54 only when the steering assist is required (the magnitude |T| of the steering torque T is equal to or higher than the threshold steering torque Tth) because the fuel consumption can be decreased compared with a hydraulic power steering device configured to always drive the hydraulic pump.

A pressure (hereinafter referred to as "discharge pressure") of the hydraulic fluid discharged by the hydraulic pump 53 is "0" at a drive start time point tps of the second electric motor 54. The discharge pressure gradually increases from the drive start time point tps of the electric motor 54, and reaches a discharge pressure in a steady state after a predetermined period has elapsed. For example, as shown in FIG. 5, when the discharge pressure in the steady state is indicated as "1", and the drive start time point tps of the second electric motor 54 is set to a time point 0, a relationship between the discharge pressure of the hydraulic pump 53 and the time is represented such that the discharge pressure increases at an approximately constant rate from the origin, and becomes constant after the predetermined period has elapsed with respect to the time. This change in the discharge pressure with respect to the time is a dynamic "gain" in contrast to the "static characteristic" of the second assist torque Ta2. The discharge pressure is "0" in the period from the generation of the steering torque T as a result of the steering to the time point at which the magnitude |T| of the steering torque reaches the threshold steering torque Tth, and the gain is thus "0". The gain in the range in which the magnitude |T| of the steering torque is equal to or higher than the threshold steering torque Tth is as shown in FIG. 5. The final second assist torque Ta2 is calculated (estimated) by multiplying the static characteristic of the second assist torque Ta2 shown in FIG. 4 by this gain. The second assist torque Ta2 that is finally estimated is thus different from the required assist torque Ta* in the initial stage of the steering.

Next, a description is given of a relationship between the first assist torque Ta1 generated by the first steering assist mechanism (EPS) 40 and the steering torque T. As described above, the first device 10 performs control such that the sum of the first assist torque Ta1 and the second assist torque Ta2 corresponds to the required assist torque Ta*. Thus, the first assist torque Ta1 is calculated so as to correspond to the value obtained by subtracting the second assist torque Ta2 from the required assist torque Ta*. The calculated first assist torque Ta1 is hereinafter also referred to as "first required assist torque Ta1*". The first required assist torque Ta1* is (Ta*−Ta2).

A detection range of the steering torque T by the torque sensor 42 is only required to be a range of torque that can be assisted by the EPS 40, and is not necessarily required to cover a range of torque that can be assisted by the entire device. In this case, the required assist torque Ta* corresponds to the second assist torque Ta2 outside the range of torque that can be assisted by the EPS 40, and, therefore, the first device 10 is only required to consider the first required assist torque Ta1* as "0" outside this range of torque.

Figure 6:
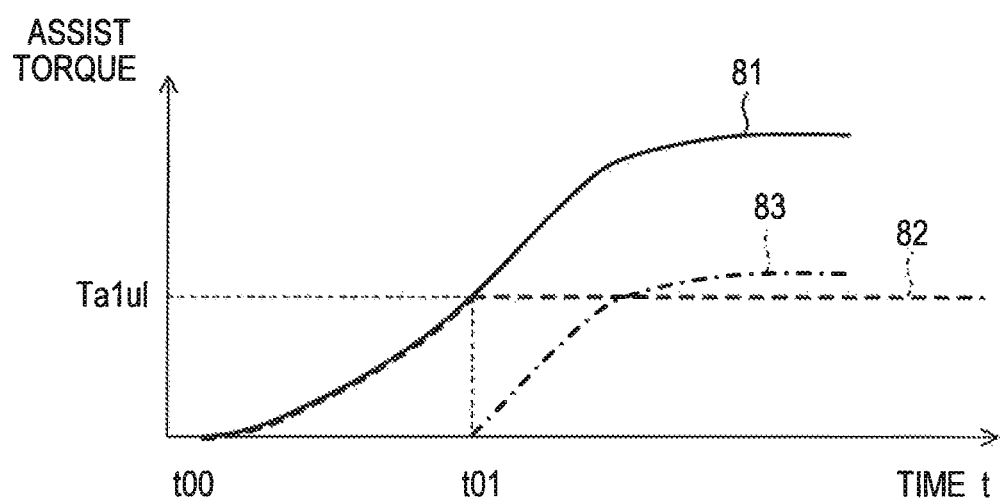
FIG. 6 is a graph for showing a temporal change in the assist torque for explaining an operation of a comparative example of the first embodiment.

Next, a description is given of the operation of the first device 10 with a focus on a temporal change in the assist torque from the start of the steering. Before the description of the operation of the first device 10, a description is given of an operation of a device of a comparative example of the first embodiment. FIG. 6 is a graph for showing a temporal change in the assist torque in a case in which the steering wheel 11 is operated by the device of the comparative example, and a steering angle θ (steering torque T) increases. In FIG. 6, the required assist torque Ta* is indicated as a solid line 81. The first assist torque Ta1 is indicated as a broken line 82, and the second assist torque Ta2 is indicated as a one dot chain line 83.

With the device of the comparative example, when the operation on the steering wheel 11 starts at a time point t00, the device of the comparative example calculates a torque corresponding to the required assist torque Ta* at an approximately same time point, and drives the electric assist motor to generate the first assist torque Ta1 so that the first assist torque Ta1 corresponds to the required assist torque Ta*. When the first assist torque Ta1 exceeds an assist limit Ta1*ul* at a time point t01, the device of the comparative example drives the hydraulic-pump drive electric motor to drive the hydraulic pump while continuing the drive of the electric assist motor. The first assist torque Ta1 is maintained at the assist limit Ta1*ul* after the time point t01.

When the device of the comparative example drives the hydraulic pump, the hydraulic fluid in the reservoir tank is drawn, and the hydraulic fluid flows from the first port 521a into the left port or the right port via the main pipe. With this, the force of moving the power piston leftward or rightward is generated. As a result, the second assist torque Ta2 is generated at the time point t01, and increases as the time elapses (the magnitude |T| of the steering torque increases).

In this way, when the assist torque Ta1 reaches the assist limit Ta1*ul*, the device of the comparative example maintains the first assist torque Ta1 at the assist limit Ta1*ul*, and uses the second electric motor to drive the hydraulic pump, to thereby generate the second assist torque Ta2. Incidentally, as the magnitude |T| of the steering torque for starting the drive of the second electric motor decreases, the hydraulic pump is driven more often, and the fuel efficiency thus deteriorates. In other words, the decrease in the assist limit Ta1*ul* leads to deterioration in the fuel efficiency. Thus, the device of the comparative example requires an electric motor (namely, an electric motor having a large rating) capable of continuing output of the relatively large assist limit Ta1*ul* for a long period. A description has been given of the example of the operation of the device of the comparative example.

Figure 7:
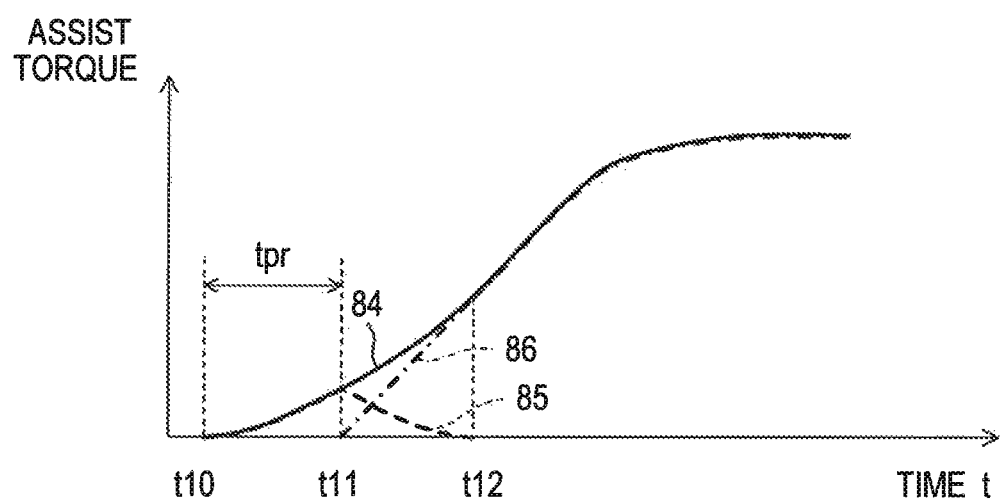
FIG. 7 is a graph for showing a temporal change in the assist torque for explaining an operation of the power steering device illustrated in FIG. 1.

Next, referring to FIG. 7, a description is given of the operation of the first device 10, In FIG. 7, the required assist torque Ta* is indicated as a solid line 84. The first assist torque Ta1 is indicated as a broken line 85, and the second assist torque Ta2 is indicated as a one dot chain line 86. In the example shown in FIG. 7, the operation on the steering wheel 11 starts at a time point t10, and the operation amount of the steering wheel 11 increases subsequently.

The required assist torque Ta* is "0" before the time point t10, that is, when the operation is not carried out on the steering wheel 11. At this time, the first device 10 stops the drive of the first electric motor 44, and stops the drive of the second electric motor 54.

As described above, in order to decrease the fuel consumption, the first device 10 starts the drive of the second electric motor 54 finally when the magnitude |T| of the steering torque becomes equal to or higher than the threshold steering torque Tth.

The first device 10 drives the first electric motor 44 so that the first assist torque Ta1 corresponds to the required assist torque Ta* while stopping the drive of the second electric motor 54 in a period (tpr) from the first time point (t10), at which the magnitude |T| of the required assist torque starts increasing from "0", to a second time point (t11), at which a predetermined specific condition is determined to be satisfied.

In this way, the first device 10 starts the drive of the electric assist motor 44 immediately after the steering wheel 11 is operated. As a result, the EPS 40 can generate the first assist torque Ta1, which is required from the initial stage of the steering. A relatively small motor is employed as the electric assist motor 44 based on a need for decreasing a cost and a mounting space, and the maximum torque that can be generated by the electric assist motor 44 is thus relatively low.

Further, the first device 10 starts the drive of the second electric motor 54 at the second time point (t11), and drives the first electric motor 44 so that the first assist torque Ta1 corresponds to the value obtained by subtracting the second assist torque Ta2 from the required assist torque Ta* after the second time point. An increase amount per unit time of the second assist torque Ta2 correlates with discharge performance (discharge pressure) of the hydraulic pump 53.

The assist start time point (above-mentioned time point t11) by the EHPS 50 is defined by the magnitude |T| of the steering torque. When the magnitude |T| of the steering torque changes from a value lower than the threshold steering torque Tth to a value equal to or higher than the threshold steering torque Tth, the first device 10 starts the assist by the EHPS 50. The time point t11, at which the magnitude |T| of the steering torque reaches the threshold steering torque Tth, is an assist start time point (hereinafter referred to as "EHPS assist start time point") by acting of the second assist torque Ta2. The period from the steering start time point t10 to the EHPS assist start time point t11 is indicated as the predetermined period tpr in FIG. 7. This predetermined period tpr is "the period from the start of the steering to the satisfaction of the second-electric-motor drive start condition". In other words, "the second-electric-motor drive start condition" is "the change in the magnitude (absolute value) |T| of the steering torque from a value lower than the threshold steering torque Tth to the threshold steering torque Tth".

When the second assist torque Ta2 is generated at the time point t11 the first device 10 controls the first required assist torque Ta1* so that the first required assist torque Ta1* corresponds to the value obtained by subtracting the second assist torque Ta2 from the required assist torque Ta*. Thus, when the second assist torque Ta2 reaches the required assist torque Ta* at the time point t12, the first device 10 sets the first required assist torque Ta1* to "0". The first device 10 transfers (replaces or "substitutes") a part of the first required assist torque Ta1* to the second assist torque Ta2 in this way.

In a case where the required assist torque Ta* is within the range of torque that can be assisted by the electric assist motor 44, a power consumption obtained when only the electric assist motor 44 is rotated so as to satisfy the required assist torque Ta* is less than a power consumption obtained when only the second electric motor 54 is similarly rotated.

(Specific Operation of First Device)

Figure 8:
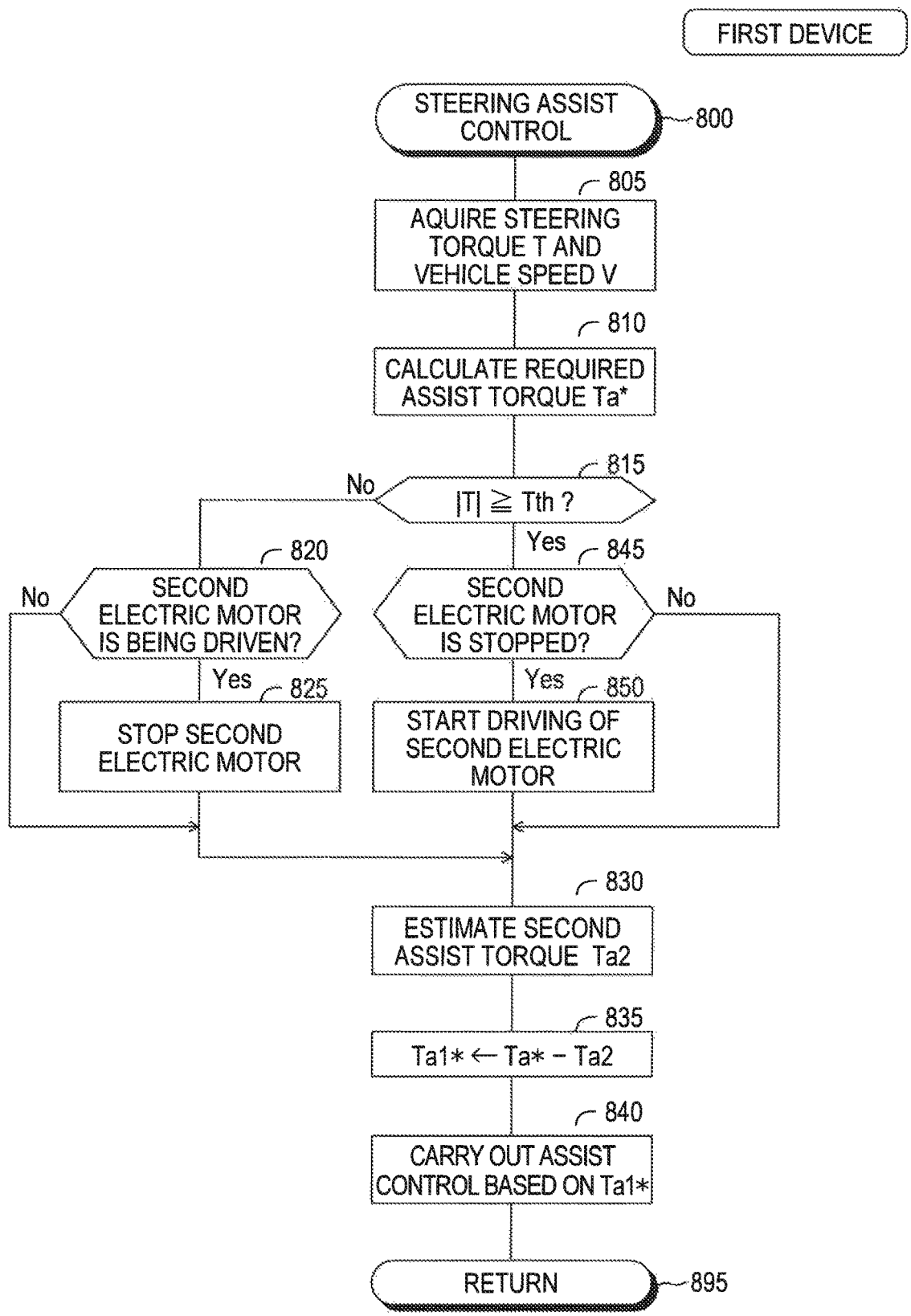
FIG. 8 is a flowchart for illustrating "a steering assist control routine" executed by a CPU of an ECU of the power steering device illustrated in FIG. 1.

Referring to FIG. 8, a description is now given of an actual operation of the first device.

<Steering Assist Control>

The CPU of the ECU 70 is configured to execute a steering assist control routine illustrated in a flowchart of FIG. 8 each time a certain period has elapsed. A description is given of respective cases.

(1) Case in which the Magnitude |T| of the Steering Torque is Lower than the Threshold Steering Torque Tth The CPU starts processing from Step 800 at a predetermined time point, proceeds to Step 805, and acquires the steering torque T and the vehicle speed V from the signal detected by the torque sensor 42 and the signal detected by the vehicle speed sensor 71, respectively. Then, the CPU proceeds to Step 810, and calculates the required assist torque Ta* based on the acquired steering torque T and vehicle speed V. More specifically, the CPU applies the acquired steering torque T and vehicle speed V to the lookup table MapTa* (T, V), which defines the relationship among the steering torque T, the vehicle speed V, and the required assist torque Ta*, to thereby calculate the required assist torque Ta* (refer to FIG. 3).

Subsequently, the CPU proceeds to Step 815 to determine whether the magnitude |T| of the steering torque is equal to or higher than the threshold steering torque Tth. Based on the above-mentioned assumption, the magnitude |T| of the steering torque is lower than the threshold steering torque Tth. Thus, the CPU makes a "No" determination at Step 815 to proceed to Step 820, at which the CPU determines whether the second electric motor 54 is driving (in other words, whether the hydraulic pump 53 is being driven). When the second electric motor 54 is driving, the CPU makes a "Yes" determination at Step 820 to proceed to Step 825, at which the CPU stops the second electric motor 54. Then the CPU proceeds to Step 830. On the other hand, when the second electric motor 54 is stopped, the CPU makes a "No" determination at Step 820 to directly proceeds to Step 830.

Then, at Step 830, the CPU estimates the second assist torque Ta2. More specifically, as described above, first, the CPU applies the acquired steering torque T and vehicle speed V to the lookup table MapTa2 (T, V) stored in the ROM, to thereby calculate the static second assist torque Ta2. Then, the CPU multiplies the dynamic "gain" at this time point. Based on the above-mentioned assumption, the second electric motor 54 and the hydraulic pump 53 are stopped, and the "gain" is thus "0". Thus, the second assist torque Ta2 estimated at Step 830 is "0".

Subsequently, the CPU proceeds to Step 835. At Step 835, the CPU sets the first required assist torque Ta1* to the value obtained by subtracting the second assist torque Ta2 from the required assist torque Ta*. As estimated at Step 830, the second assist torque Ta2 is "0". Thus, the first required assist torque Ta1* is a value equal to the required assist torque Ta*. Subsequently, the CPU proceeds to Step 840 to carry out the steering assist control based on the first required assist torque Ta1* and proceeds to Step 895 to tentatively terminate the present routine.

Figure 9:
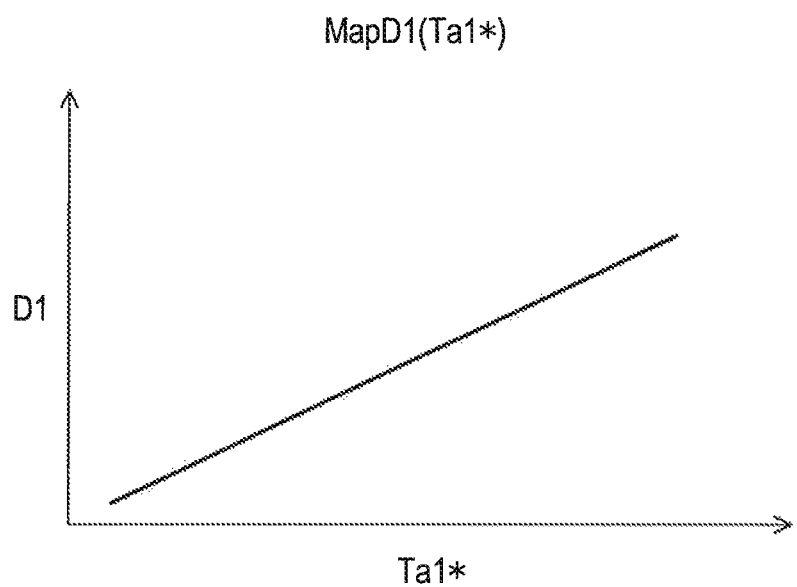
FIG. 9 is a graph for explaining a relationship between a first required assist torque of an electric power steering device illustrated in FIG. 1 and a drive pulse duty ratio.

The steering assist control carried out at Step 840 is as follows. The CPU converts the first required assist torque Ta1* to a current value for driving the electric assist motor 44. More specifically, the CPU determines a duty ratio D1 of a drive current pulse in a driving circuit configured to drive the electric assist motor 44 in the ECU 70 from the set first required assist torque Ta1* as follows. The CPU applies the calculated first required assist torque Ta1* to a lookup table MapD1 (Ta1*), which defines a relationship between the duty ratio D1 and the first required assist torque Ta1*, to thereby determine the duty ratio D1 of the drive current pulse. As a result, an effective current value for driving the electric assist motor 44 is determined. As shown in FIG. 9, according to this lookup table MapD1 (Ta1*), as the first required assist torque Ta1* increases, the duty ratio D1 increases. As described above, the first device 10 is configured to apply pulse width modulation (PWM) control to the electric assist motor 44.

(2) Case in which the Magnitude |T| of the Steering Torque is Equal to or Higher than the Threshold Steering Torque Tth Based on the above-mentioned assumption, the magnitude |T| of the steering torque is equal to or higher than the threshold steering torque Tth. Thus, the CPU makes a "Yes" determination at Step 815 to proceed to Step 845, at which the CPU determines whether the second electric motor 54 is stopped. When the second electric motor 54 is stopped, the CPU makes a "Yes" determination at Step 845 to proceed to Step 850, at which the CPU starts the drive of the second electric motor 54, and proceeds to Step 830. On the other hand, when the second electric motor 54 is being driven, the CPU makes a "No" determination at Step 845 to directly proceed to Step 830.

Then, at Step 830, the CPU estimates the second assist torque Ta2. The CPU applies the acquired steering torque T and vehicle speed V to the lookup table MapTa2 (T, V), to thereby calculate the static second assist torque Ta2. At the current time point, the hydraulic pump 53 is operating, and the dynamic "gain" is calculated in accordance with an elapsed period from the drive start time point tps of the second electric motor 54. Thus, at Step 830, the CPU multiplies the calculated static second assist torque Ta2 by the dynamic "gain", to thereby calculate the second assist torque Ta2.

Subsequently, the CPU proceeds to Step 835 to set the first required assist torque Ta1* to the value obtained by subtracting the second assist torque Ta2 from the required assist torque Ta*. Subsequently, the CPU proceeds to Step 840 to carry out the steering assist control based on the first required assist torque Ta1* set at Step 835, and proceeds to Step 895 to tentatively terminate the present routine.

When the predetermined period has elapsed, the CPU again starts the processing from Step 800. The CPU makes a "Yes" determination at Step 815 to proceed to Step 830 via Step 845. The "gain" is increasing from "0" to "1", or is maintained at "1" at the current time point after the drive start time point tps of the second electric motor 54 has elapsed as shown in FIG. 5, Thus, the second assist torque Ta2 increases when the magnitude |T| of the steering torque is increasing. Thus, in this case, the first required assist torque Ta1* is smaller than a previous value by a value obtained by subtracting "the increase in the required assist torque Ta*" from "the increase in the second assist torque Ta2". In other words, at Step 835, a part of the first required assist torque Ta1* is transferred to (replaced or substituted by) the second assist torque Ta2.

Subsequently, the CPU proceeds to Step 840 to carry out the steering assist control based on the first required assist torque Ta1* and proceeds to Step 895 to tentatively terminate the present routine. After a time point at which the second assist torque Ta2 corresponds to the required assist torque Ta* as in the case of the time point t12 of FIG. 7, the first required assist torque Ta1* is set to "0" until the magnitude |T| of the steering assist torque decreases to fall below the threshold steering torque Tth.

As described above, the ECU 70 of the first device determines the required assist torque Ta* based on the operation on the steering wheel 11. The ECU 70 controls the first electric motor (electric assist motor) 44 and the second electric motor (hydraulic-pump drive electric motor) 54 so that a resultant force of the first assist torque Ta1 applied by the first electric motor (electric assist motor) 44 and the second assist torque Ta2 applied by the hydraulic actuator 55 corresponds to the required assist torque Ta*. The ECU 70 stops the drive of the first electric motor 44, and stops the drive of the second electric motor 54 when the required assist torque Ta* is zero. The ECU 70 drives the first electric motor 44 so that the first assist torque Ta1 corresponds to the required assist torque Ta* while stopping the drive of the second electric motor 54 in the period from the first time point t10, at which the magnitude of the required assist torque Ta* starts increasing from 0, to the second time point t11, at which the predetermined specific condition is determined to be satisfied. The ECU 70 starts the drive of the second electric motor 54 at the second time point t11 to thereby increase the second assist torque Ta2 as the time elapses, and drives, after the second time point t11, the first electric motor 44 so that the first assist torque Ta1 corresponds to the value obtained by subtracting the second assist torque Ta2 from the required assist torque Ta*, to thereby decrease the first assist torque Ta1 as the time elapses.

In other words, in the steering initial stage, the first device 10 stops the drive of the second electric motor 54, and uses only the electric assist motor 44 to generate the required assist torque Ta*. Then, when the magnitude |T| of the steering torque, which is one of the predetermined specific conditions, exceeds the threshold steering torque Tth, the first device 10 gradually increases the assist torque Ta2 by the hydraulic actuator 55. On the other hand, the first device 10 decreases the assist torque Ta1 generated by the electric assist motor 44 so that the assist torque Ta1 corresponds to the value obtained by subtracting the second required assist torque Ta2 from the required assist torque Ta*. Thus, the first device 10 is not required to maintain the assist torque Ta1 generated by the electric assist motor 44. For that reason, the first device 10 can employ a small motor having a small rating as the electric assist motor 44. Consequently, with the above-mentioned configuration, the power steering device that has a small size, and can sufficiently generate the required assist force from the steering initial stage can be implemented.

Second Embodiment

Next, a description is given of a power steering device (hereinafter also referred to as "second device") according to a second embodiment of the present invention. The second device is different from the first device 10 in that not the magnitude |T| of the steering torque but indicators correlating with a speed (hereinafter also referred to as "steering speed") of the operation on the steering wheel 11 are used as the second-electric-motor drive start condition. In the following, a description is mainly given of the point that indicators correlating with the steering speed are used as the second-electric-motor drive start condition.

In a case where the second-electric-motor drive start condition is the threshold steering torque Tth as in the first device 10, when the magnitude |T| of the steering torque reaches the threshold steering torque Tth, the second-electric-motor drive start condition is satisfied independently of a load state of the electric assist motor 44 of the EPS 40.

However, from a view point of the fuel consumption (electric power consumption), it is effective to delay the start of the operation of the hydraulic pump 53 (hereinafter also referred to as "start of the assist by the EHPS 50") as much as possible unless the driver feels a sense of discomfort.

Thus, the second device sets a threshold value for the start of the assist by the EHPS 50 to each of three indicators including (1) the steering speed, (2) the yaw rate of the vehicle, and (3) the lateral acceleration of the vehicle in order to delay the start of the assist by the EHPS 50 as much as possible. A description is now given of the respective three indicators.

(1) Case in which the Steering Speed is Used as the Indicator

Figure 10A:
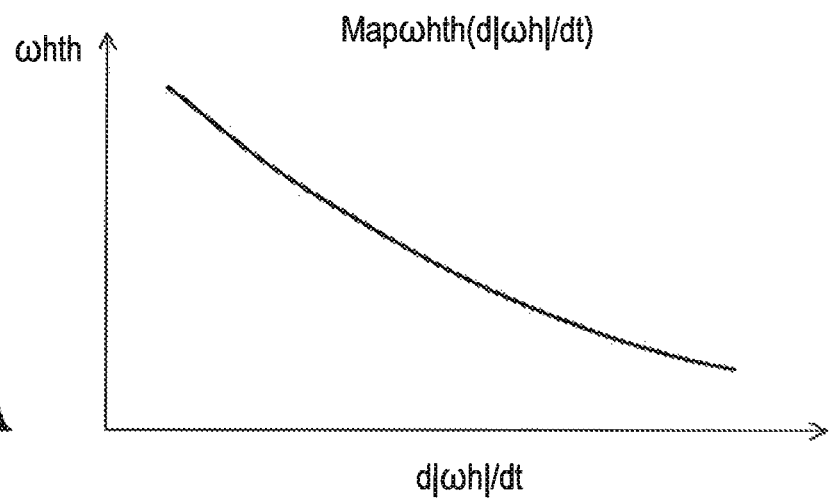
FIG. 10A is a graph for explaining a relationship between a magnitude of a steering acceleration and a threshold steering speed set in a power steering device (second device) according to a second embodiment of the present invention.

A steering speed $\omega h$ is a time derivative of a steering angle $\theta h$ detected by a steering angle sensor (not shown) provided in the first shaft 211. A detection value output from the steering angle sensor is set so as to take a positive value when the steering wheel 11 is rotated toward the left steering direction, and a negative value when the steering wheel 11 is rotated toward the right steering direction. When a magnitude (absolute value) $|\omega h|$ of the steering speed changes from a value lower than a threshold steering speed $\omega hth$ to a value equal to or higher than the threshold steering speed $\omega hth$, the second device starts the assist by the EHPS 50. Further, as shown in FIG. 10A, the second device has stored in the ROM a lookup table Map$\omega hth$ (d|$\omega h$|/dt) defined so that the threshold steering speed $\omega hth$ decreases as a change rate (increase amount) d|$\omega h$|/dt per unit time of the magnitude $|\omega h|$ of the steering speed, namely, a magnitude of a steering acceleration increases.

With this configuration, the threshold steering speed $\omega hth$ is high for "gentle steering", in which the magnitude d|$\omega h$|/dt of the steering acceleration is relatively low, and the start of the assist by the EHPS 50 is thus delayed more. In other words, the second device increases the assist amount borne by the EPS 40. As a result, the second device can decrease the operation frequency of the EHPS 50, and can thus decrease influence on the fuel efficiency. Meanwhile, the threshold steering speed $\omega hth$ is low for "quick steering", in which the magnitude d|$\omega h$|/dt of the steering acceleration is relatively high, and the start of the assist by the EHPS 50 is thus advanced more. As a result, the followability of the steering assist is secured even when a high torque is required in a relatively early stage after the start of the steering as a result of the quick steering.

(2) Case in which the Yaw Rate is Used as the Indicator

Figure 10B:
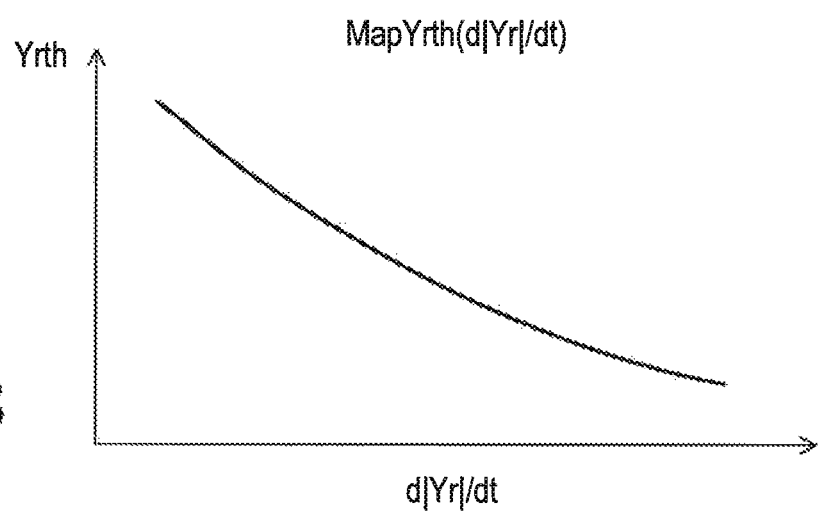
FIG. 10B is a graph for explaining a relationship between an increase amount per unit time of a magnitude of a yaw rate and a threshold yaw rate set in the second device.

A yaw rate Yr is detected by a yaw rate sensor (not shown) provided in the vehicle. A detection value output from the yaw rate sensor is set so as to take a positive value when the steering wheel 11 is rotated toward the left steering direction, and a negative value when the steering wheel 11 is rotated toward the right steering direction. When a magnitude (absolute value) |Yr| of the yaw rate changes from a value lower than a threshold yaw rate Yrth to a value equal to or higher than the threshold yaw rate Yrth, the second device starts the assist by the EHPS 50. Further, as shown in FIG. 10B, the second device has stored in the ROM a lookup table MapYrth (d|Yr|/dt) defined so that the threshold yaw rate Yrth decreases as a change rate (increase amount) d|Yr|/dt per unit time of the magnitude |Yr| of the yaw rate increases.

With this configuration, the threshold yaw rate Yrth is high for "the gentle steering", in which the increase amount d|Yr|/dt per unit time of the magnitude of the yaw rate is relatively low, and the start of the assist by the EHPS 50 is thus delayed more. In other words, the second device increases the assist amount borne by the EPS 40. As a result, the second device can decrease the operation frequency of the EHPS 50, and can thus decrease influence on the fuel efficiency. Meanwhile, the threshold yaw rate Yrth is low for "the quick steering", in which the increase amount d|Yr|/dt per unit time of the magnitude of the yaw rate is relatively high, and the start of the assist by the EHPS 50 thus is advanced more. As a result, the following property of the steering assist is secured even when a high torque is required in the relatively early stage after the start of the steering as a result of the quick steering.

(3) Case in which the Lateral Acceleration is Used as the Indicator

Figure 10C:
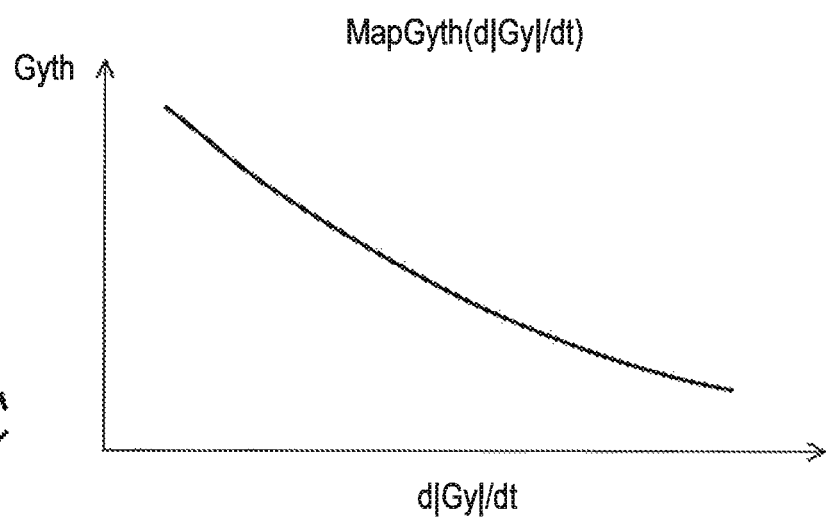
FIG. 10C is a graph for explaining a relationship between an increase amount per unit time of a magnitude of a lateral acceleration and a threshold lateral acceleration set in the second device.

A lateral acceleration Gy is detected by a lateral acceleration sensor (not shown) provided in the vehicle. A detection value output from the lateral acceleration sensor is set so as to take a positive value for a left turn, and a negative value for a right turn. When a magnitude (absolute value) |Gy| of the lateral acceleration changes from a value lower than a threshold lateral acceleration Gyth to a value equal to or higher than the threshold lateral acceleration Gyth, the second device starts the assist by the EHPS 50. Further, as shown in FIG. 10C, the second device has stored in the ROM a lookup table MapGyth (d|Gy|/dt) defined so that the threshold lateral acceleration Gyth decreases as a change rate (increase amount) d|Gy|/dt per unit time of the magnitude |Gy| of the lateral acceleration increases.

With this configuration, the threshold lateral acceleration Gyth is high for "the gentle steering", in which the increase amount d|Gy|/dt per unit time of the magnitude of the lateral acceleration is relatively low, and the start of the assist by the EHPS 50 is thus delayed more. In other words, the second device increases the assist amount borne by the EPS 40. As a result, the second device can decrease the operation frequency of the EHPS 50, and can thus decrease influence on the fuel efficiency. Meanwhile, the threshold lateral acceleration Gyth is low for "the quick steering", in which the increase amount d|Gy|/dt per unit time of the magnitude of the lateral acceleration is relatively high, and the start of the assist by the EHPS 50 is thus advanced more. As a result, the following property of the steering assist is secured even when a high torque is required in the relatively early stage after the start of the steering as a result of the quick steering.

The magnitude |ωh| of the steering speed, the magnitude |Yr| of the yaw rate, and the magnitude |Gy| of the lateral acceleration are hereinafter referred to as "steering speed indication amounts". The threshold steering speed ωhth, the threshold yaw rate Yrth, and the threshold lateral acceleration Gyth, which are the threshold values for "the steering speed indication amounts", are referred to as "threshold indication amounts". The magnitude d|ωh|/dt of the steering acceleration, the increase amount d|Yr|/dt per unit time of the magnitude of the yaw rate, and the increase amount d|Gy|/dt per unit time of the magnitude of the lateral acceleration are referred to as "increase amounts of the steering speed indication amounts per unit time".

(Specific Operation of Second Device)

Figure 11:
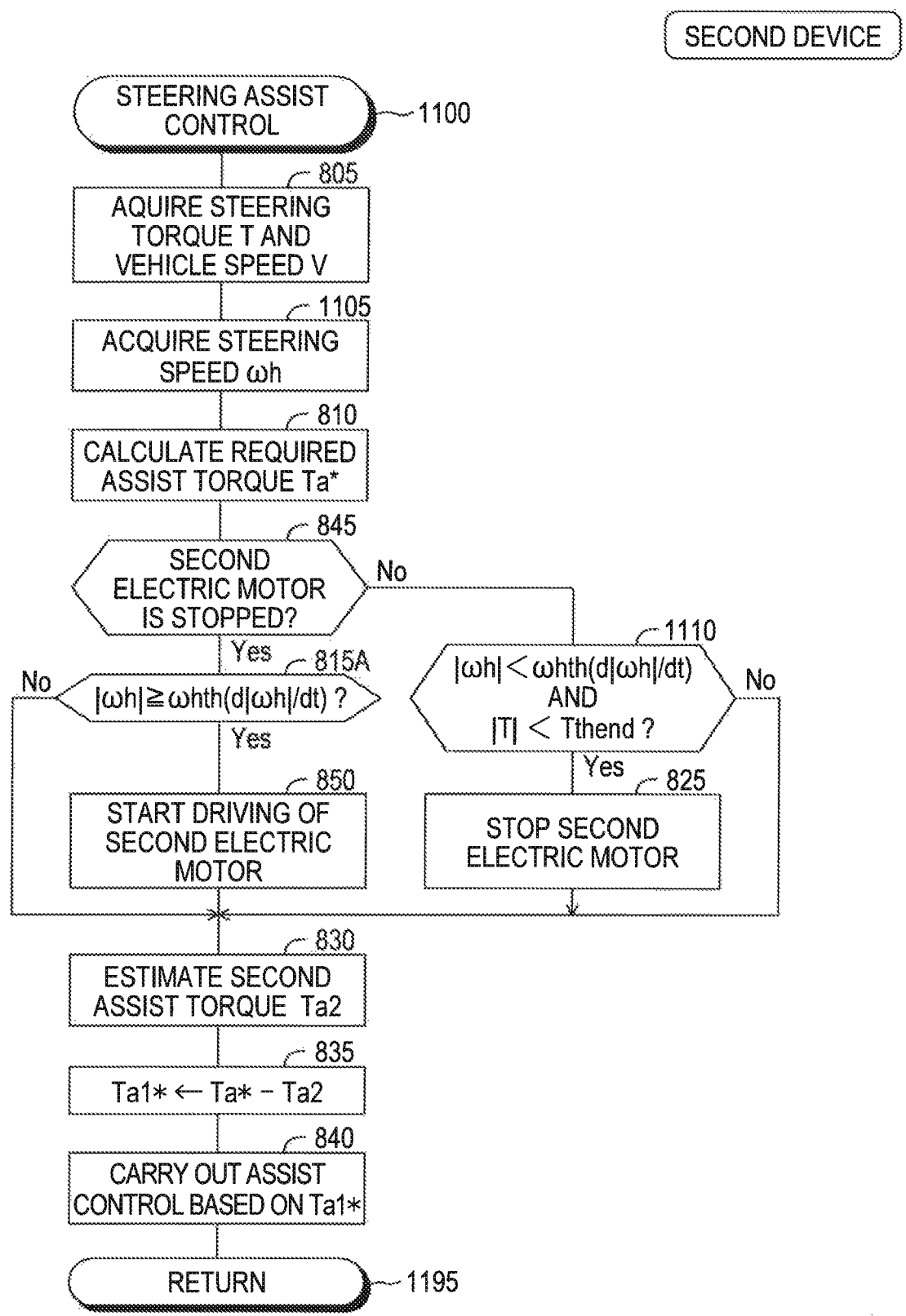
FIG. 11 is a flowchart for illustrating "a steering assist control routine" executed by a CPU of an ECU of the second device.

Referring to FIG. 11, a description is now given of an actual operation of the second device (when the steering speed is an indicator).

<Steering Assist Control>

The CPU of the ECU 70 is configured to execute a steering assist control routine illustrated in a flowchart of FIG. 11 each time a certain period has elapsed. A description is given of respective cases. The same reference numeral is assigned to the same step as the step referred to in the description of the operation of the first device.

(1) Case in which the Steering is in the Initial Stage after the Start, and the Second-Electric-Motor Drive Start Condition is not Satisfied The CPU starts processing from Step 1100 at a predetermined time point, proceeds to Step 805, and acquires the steering torque T and the vehicle speed V from the signal detected by the torque sensor 42 and the signal detected by the vehicle speed sensor 71, respectively. Then, the CPU proceeds to Step 1105, and acquires the steering speed ωh (time derivative of the steering angle θh) from the signal detected by the steering angle sensor. Then, the CPU proceeds to Step 810, applies the acquired steering torque T and vehicle speed V to the lookup table MapTa* (T, V), to thereby calculate the required assist torque Ta*, and proceeds to Step 845.

Based on the above-mentioned assumption, the second-electric-motor drive start condition is not satisfied, and the second electric motor 54 is thus stopped. Thus, the CPU makes a "Yes" determination at Step 845 to proceed to Step 815A, at which the CPU determines whether the magnitude |ωh| of the steering speed is equal to or higher than the threshold steering speed ωhth (d|ωh|/dt). As described above, the threshold steering speed ωhth (d|ωh|/dt) is a function of the magnitude d|ωh|/dt of the steering acceleration. Based on the above-mentioned assumption, the second-electric-motor drive start condition is not satisfied. Thus, the CPU makes a "No" determination at Step 815A to directly proceed to Step 830, at which the CPU estimates the second assist torque Ta2. At the current time point, the second assist torque Ta2 is "0".

Subsequently, the CPU proceeds to Step 835 to set the first required assist torque Ta1* to the value obtained by subtracting the second assist torque Ta2 from the required assist torque Ta*. At the current time point, the second assist torque Ta2 is "0". Thus, the first required assist torque Ta1* is a value equal to the required assist torque Ta*. Then, the CPU proceeds to Step 840 to carry out the steering assist control based on the first required assist torque Ta1*, and proceeds to Step 1195 to tentatively terminate the present routine.

(2) Case in which the Second-Electric-Motor Drive Start Condition has Just been Satisfied after the Steering Starts The CPU starts the processing from Step 1100 at the predetermined time point, and proceeds to Step 845 via Step 805, Step 1105, and Step 810. Based on the above-mentioned assumption, the second electric motor 54 has not started the drive at the current time point. Thus, the CPU makes a "Yes" determination at Step 845 to proceed to Step 815A. Based on the above-mentioned assumption, the second-electric-motor drive start condition is satisfied. In other words, the magnitude |ωh| of the steering speed is equal to or higher than the threshold steering speed ωhth (d|ωh|/dt). Thus, the CPU makes a "Yes" determination at Step 815A to proceed to Step 850, at which the CPU starts the drive of the second electric motor 54 to proceed to Step 830.

At Step 830, the CPU estimates the second assist torque Ta2. At the current time point, the second electric motor 54 is driving, and the second assist torque Ta2 is thus generated. Then, the CPU proceeds to Step 835 to set the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1195 to tentatively terminate the present routine.

(3) Case in which the Second Electric Motor has Started the Driving (is Driving), and the Magnitude $|\omega h|$ of the Steering Speed is Equal to or Higher than the Threshold Steering Speed $\omega$hth The CPU successively carries out the processing from Step 1100 at the predetermined time point, and proceeds to Step 845. Based on the above-mentioned assumption, the second electric motor 54 is driving. Thus, the CPU makes a "No" determination at Step 845 to proceed to Step 1110, at which the CPU determines whether the magnitude $|\omega h|$ of the steering speed is lower than the threshold steering speed $\omega$hth (d$|\omega h|$/dt) and the magnitude $|T|$ of the steering torque is lower than a threshold steering end torque Tthend. The threshold steering end torque Tthend is one of conditions for stopping the second electric motor 54. The threshold steering end torque Tthend may be set to the same value as the threshold steering torque Tth. Based on the above-mentioned assumption, the magnitude $|\omega h|$ of the steering speed is equal to or higher than the threshold steering speed $\omega$hth (d$|\omega h|$/dt). Thus, the CPU makes a "No" determination at Step 1110 to directly proceed to Step 830, at which the CPU estimates the second assist torque Ta2 to proceed to Step 835.

At Step 835, the CPU sets the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1195 to tentatively terminate the present routine.

(4) Case in which the Second Electric Motor has Started the Driving (is Driving), the Magnitude $|\omega h|$ of the Steering Speed is Less than the Threshold Steering Speed $\omega$hth, and the Magnitude $|T|$ of the Steering Torque is Less than the Threshold Steering End Torque Tthend The CPU successively carries out the processing from Step 1100 at the predetermined time point, and proceeds to Step 845. Based on the above-mentioned assumption, the second electric motor 54 is driving. Thus, the CPU makes a "No" determination at Step 845 to proceed to Step 1110. Based on the above-mentioned assumption, the magnitude $|\omega h|$ of the steering speed is less than the threshold steering speed $\omega$hth (d$|\omega h|$/dt), and the magnitude $|T|$ of the steering torque is lower than the threshold steering end torque Tthend. Thus, the CPU makes a "Yes" determination at Step 1110 to proceed to Step 825, at which the CPU stops the second electric motor 54. Subsequently, the CPU proceeds to Step 830 to estimate the second assist torque Ta2, and proceeds to Step 835.

At Step 835, the CPU sets the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1195 to tentatively terminate the present routine.

In the specific operation of the second device described referring to FIG. 11, as the method of delaying the start of the assist by the EHPS 50, the method (the method of (1) described above) of using the magnitude $|\omega h|$ of the steering speed as "the steering speed indication amount" is exemplified. However, the method (the method of (2) described above) of using the magnitude $|Yr|$ of the yaw rate of the vehicle as "the steering speed indication amount" or the method (the method of (3) described above) of using the magnitude $|Gy|$ of the lateral acceleration of the vehicle as the indicator may be employed.

In other words, the CPU of the ECU 70 may be configured to acquire the yaw rate Yr at Step 1105A (not shown), which replaces Step 1105 of FIG. 11, and determine whether the magnitude $|Yr|$ of the yaw rate is equal to or more than the threshold yaw rate Yrth at Step 815B (not shown), which replaces Step 815A of FIG. 11. The threshold yaw rate Yrth is a function of the increase amount d$|Yr|$/dt per unit time of the magnitude of the yaw rate as described above. In this case, the second device stores the lookup table shown in FIG. 10(B) in advance in the ROM.

Further, the CPU of the ECU 70 may be configured to acquire the lateral acceleration Gy at Step 1105B (not shown), which replaces Step 1105 of FIG. 11, and determine whether the magnitude $|Gy|$ of the lateral acceleration is equal to or more than the threshold lateral acceleration Gyth at Step 815C (not shown), which replaces Step 815A of FIG. 11. The threshold lateral acceleration Gyth is a function of the increase amount d$|Gy|$/dt per unit time of the magnitude of the lateral acceleration as described above. In this case, the second device stores the lookup table shown in FIG. 10(C) in advance in the ROM.

As described above, the second device determines that the specific condition is satisfied when the steering speed indication amount, which is one of the magnitude $|\omega h|$ of the steering speed, the magnitude $|Yr|$ of the yaw rate of the vehicle, and the magnitude $|Gy|$ of the lateral acceleration of the vehicle, changes from a value less than the predetermined threshold indication amount to a value equal to or more than the threshold indication amount. As a result, for example, when the vehicle travels on a gentle curve or changes a lane, the assist by the hydraulic actuator 55 is not required, and the second electric motor 54 is not driven when the steering speed indication amount is less than the predetermined threshold indication amount. Consequently, the second electric motor 54 is driven less often, which is effective for the improvement of the fuel efficiency.

Third Embodiment

Next, a description is given of a power steering device (hereinafter also referred to as "third device") according to a third embodiment of the present invention. The third device is different from the first device 10 and the second device in that the third device has a function of avoiding (preventing) entrance into an overload state of the electric assist motor 44. In the following, a description is mainly given of the function of avoiding the entrance into the overload state of the electric assist motor 44.

In order to improve the fuel efficiency of the vehicle, it is effective to delay the start of the assist by the EHPS 50 as much as possible as stated in the description of the second embodiment (second device). Meanwhile, when the start of the assist by the EHPS 50 is delayed, the electric assist motor 44 may enter the overload state. However, the electric assist motor 44 is required to be used within a range of a rated power. Thus, the third device is configured to detect a temperature of the electric assist motor 44 or a temperature of the driving circuit of the electric assist motor 44, and advance the start timing of the assist by the EHPS 50 more as the detected temperature increases. In other words, the third device is set to decrease "the threshold indication amount" with respect to "the steering speed indication amount" as the detected temperature increases. The temperature of the electric assist motor 44 is acquired by a temperature sensor provided on a housing of the electric assist motor 44. The driving circuit includes semiconductor devices configured to control an amount of current supply to the electric assist motor 44. The temperature of the driving circuit of the electric assist motor 44 is acquired by, for example, a temperature sensor provided on the semiconductor device, or integrated into the semiconductor device.

When the steering assist by the EHPS 50 is started, the third device sets the first assist torque Ta1 generated by the EPS 40, which has already started the steering assist, to the value obtained by subtracting the second assist torque Ta2 generated by the EHPS 50 from the required assist torque Ta*. In other words, in the third device, when the steering assist by the EHPS 50 is started, the assist torque is gradually transferred from the first assist torque Ta1 to the second assist torque Tat. The assist by the EPS 40 is stopped at a time point at which the period of "the transfer" has elapsed, namely, a time point at which the first assist torque Ta1 becomes zero. Thus, when the start of the assist by the EHPS 50 is advanced, the period during which the EPS 40 is carrying out the assist accordingly decreases, and the entrance of the electric assist motor 44 into the overheat state (overload state) is thus avoided.

(Specific Operation of Third Device)

Figure 12:
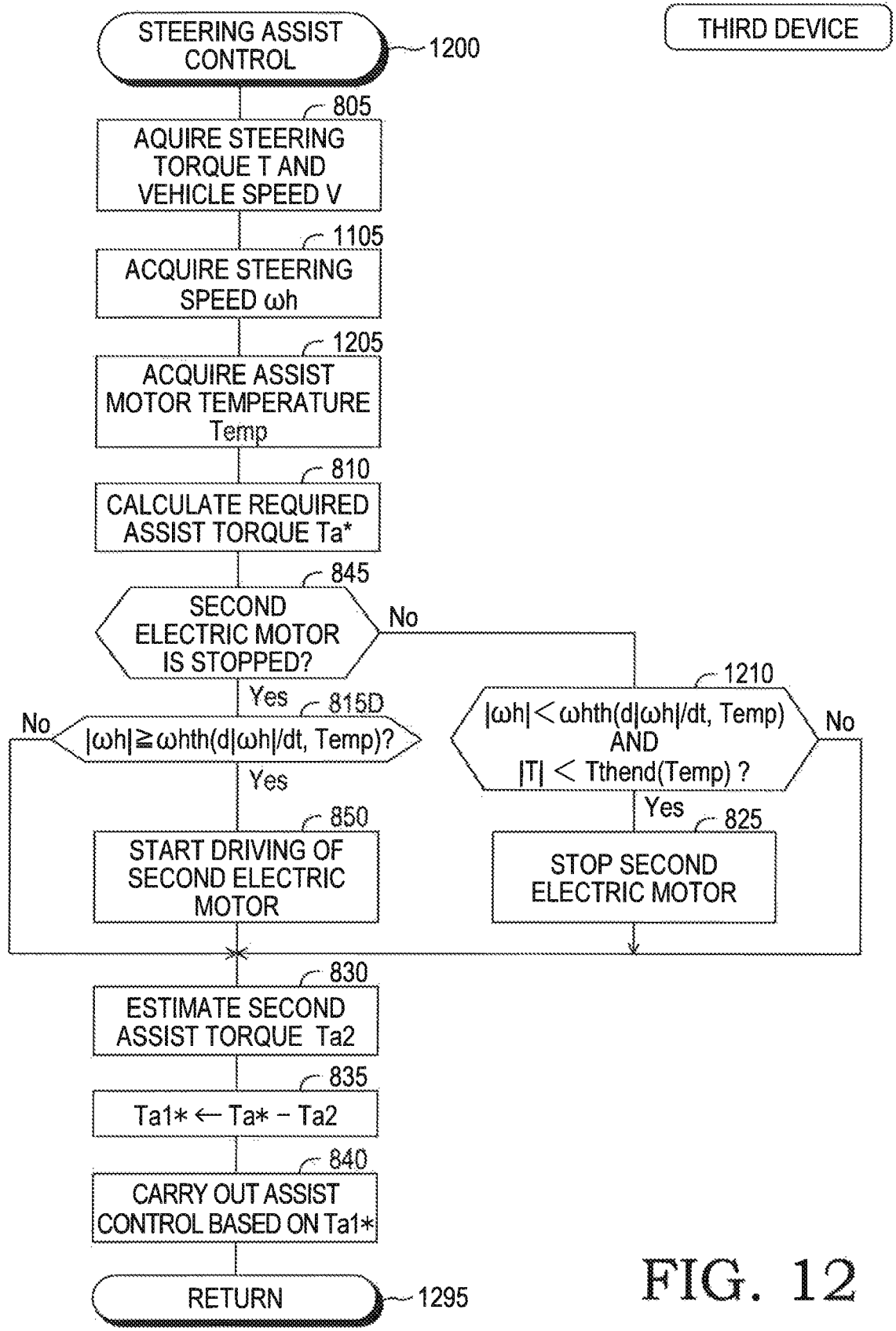
FIG. 12 is a flowchart for illustrating "a steering assist control routine" executed by a CPU of an ECU of a power steering device (third device) of a third embodiment of the present invention.

Referring to FIG. 12, a description is now given of an actual operation of the third device.

<Steering Assist Control>

The CPU of the ECU 70 is configured to execute a steering assist control routine illustrated in a flowchart of FIG. 12 each time a certain period has elapsed. A description is given of respective cases. The same reference numeral is assigned to the same step as the step referred to in the description of the operation of the second device.

(1) Case in which the Steering is in the Initial Stage after the Start, and the Second-Electric-Motor Drive Start Condition is not Satisfied The CPU starts processing from Step 1200 at a predetermined time point, proceeds to Step 805, and acquires the steering torque T and the vehicle speed V from the signal detected by the torque sensor 42 and the signal detected by the vehicle speed sensor 71, respectively. Then, the CPU proceeds to Step 1105, and acquires the steering speed ωh (time derivative of the steering angle θh) from the signal detected by the steering angle sensor. Then, the CPU proceeds to Step 1205, and acquires a temperature (electric-assist-motor temperature) Temp of the electric assist motor 44 detected by the temperature sensor (not shown). Then, the CPU proceeds to Step 810, applies the acquired steering torque T and vehicle speed V to the lookup table MapTa* (T, V), to thereby calculate the required assist torque Ta*, and proceeds to Step 845.

Figure 13:
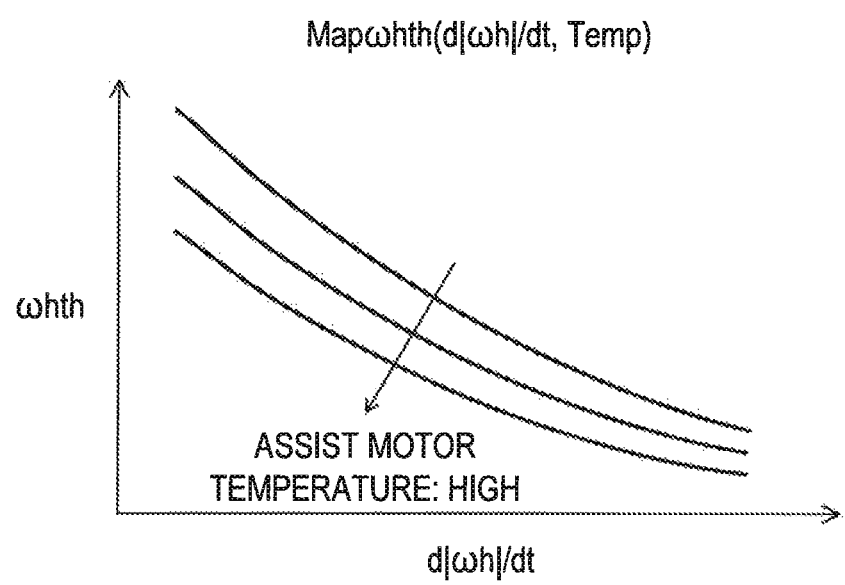
FIG. 13 is a graph for explaining a relationship between a magnitude of a steering acceleration, a motor temperature, and a threshold steering speed set in the third device.

Based on the above-mentioned assumption, the second-electric-motor drive start condition is not satisfied, and the second electric motor 54 is thus stopped. Thus, the CPU makes a "Yes" determination at Step 845 to proceed to Step 815D, at which the CPU determines whether the magnitude |ωh| of the steering speed is equal to or higher than the threshold steering speed ωhth (d|ωh|/dt, Temp). As shown in FIG. 13, the threshold steering speed ωhth decreases as the magnitude d|ωh|/dt of the steering acceleration increases, and decreases as the electric-assist-motor temperature Temp increases. Thus, the threshold steering speed ωhth is calculated by applying the acquired magnitude d|ωh|/dt of the steering acceleration and electric-assist-motor temperature Temp to a lookup table Mapωhth (d|ωh|/dt, Temp), which defines a relationship among the magnitude d|ωh|/dt of the steering acceleration, the electric-assist-motor temperature Temp, and the threshold steering speed ωhth.

Based on the above-mentioned assumption, the steering speed ωh is lower than the threshold steering speed ωhth, and thus the second-electric-motor drive start condition is not satisfied. Thus, the CPU makes a "No" determination at Step 815D to directly proceed to Step 830, at which the CPU estimates the second assist torque Ta2. At the current time point, the second assist torque Ta2 is "0".

Subsequently, the CPU proceeds to Step 835 to set the first required assist torque Ta1* to the value obtained by subtracting the second assist torque Ta2 from the required assist torque Ta*. At the current time point, the second assist torque Ta2 is "0". Thus, the first required assist torque Ta1* is a value equal to the required assist torque Ta*. Subsequently, the CPU proceeds to Step 840 to carry out the steering assist control based on the first required assist torque Ta1*, and proceeds to Step 1295 to tentatively terminate the present routine.

(2) Case in which the Second-Electric-Motor Drive Start Condition has Just been Satisfied after the Steering Starts The CPU starts the processing from Step 1200 at the predetermined time point, and proceeds to Step 845 via Step 805, Step 1105, Step 1205, and Step 810. Based on the above-mentioned assumption, the second electric motor 54 has not started the drive at the current time point. Thus, the CPU makes a "Yes" determination at Step 845 to proceed to Step 815D. Based on the above-mentioned assumption, the second-electric-motor drive start condition is satisfied. In other words, the magnitude |ωh| of the steering speed is equal to or higher than the threshold steering speed ωhth. Thus, the CPU makes a "Yes" determination at Step 815D to proceed to Step 850, at which the CPU starts the drive of the second electric motor 54 to proceed to Step 830.

The CPU estimates the second assist torque Ta2. At the current time point, the second electric motor 54 is driving, and the second assist torque Ta2 is thus generated. Subsequently, the CPU proceeds to Step 835 to set the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1295 to tentatively terminate the present routine.

(3) Case in which the Second Electric Motor has Started the Driving (is Driving), and the Magnitude |ωh| of the Steering Speed is Equal to or Higher than the Threshold Steering Speed ωhth The CPU successively carries out the processing from Step 1200 at the predetermined time point, and proceeds to Step 845. Based on the above-mentioned assumption, the second electric motor 54 is driving. Thus, the CPU makes a "No" determination at Step 845 to proceed to Step 1210, at which the CPU determines whether the magnitude |ωh| of the steering speed is lower than the threshold steering speed ωhth (d|ωh|/dt, Temp) and the magnitude |T| of the steering torque is lower than the threshold steering end torque Tthend. Based on the above-mentioned assumption, the magnitude |ωh| of the steering speed is equal to or higher than the threshold steering speed ωhth (d|ωh|/dt, Temp).

Thus, the CPU makes a "No" determination at Step 1210 to directly proceed to Step 830, at which the CPU estimates the second assist torque Ta2, and proceeds to Step 835.

At Step 835, the CPU sets the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1295 to tentatively terminate the present routine.

(4) Case in which the Second Electric Motor has Started the Driving (is Driving), the Magnitude |ωh| of the Steering Speed is Less than the Threshold Steering Speed ωhth, and the Magnitude |T| of the Steering Torque is Less than the Threshold Steering End Torque Tthend The CPU successively carries out the processing from Step 1200 at the predetermined time point, and proceeds to Step 845. Based on the above-mentioned assumption, the second electric motor 54 is driving. Thus, the CPU makes a "No" determination at Step 845 to proceed to Step 1210. Based on the above-mentioned assumption, the magnitude |ωh| of the steering speed is less than the threshold steering speed ωhth (d|ωh|/dt, Temp), and the magnitude |T| of the steering torque is lower than the threshold steering end torque Tthend. Thus, the CPU makes a "Yes" determination at Step 1210 to proceed to Step 825, at which the CPU stops the second electric motor 54. Subsequently, the CPU proceeds to Step 830 to estimate the second assist torque Ta2, and proceeds to Step 835.

At Step 835, the CPU sets the first required assist torque Ta1* to the value obtained by subtracting the second assist torque Ta2 from the required assist torque Ta*. Subsequently, the CPU proceeds to Step 840 to carry out the steering assist control based on the first required assist torque Ta1*, and proceeds to Step 1295 to tentatively terminate the present routine.

In the specific operation of the third device described referring to FIG. 12, as the method of advancing the start of the assist by the EHPS 50, the method of using the magnitude |ωh| of the steering speed as "the steering speed indication amount" is exemplified. However, the method of using the magnitude |Yr| of the yaw rate of the vehicle as "the steering speed indication amount" or the method of using the magnitude |Gy| of the lateral acceleration of the vehicle as "the steering speed indication amount" may be employed.

In other words, the CPU of the ECU 70 may be configured to acquire the yaw rate Yr at Step 1105A (not shown), which replaces Step 1105 of FIG. 12, and determine whether the magnitude |Yr| of the yaw rate is equal to or more than the threshold yaw rate Yrth (d|Yr|/dt, Temp) at Step 815E (not shown), which replaces Step 815D of FIG. 12. The threshold yaw rate Yrth is a function of the increase amount d|Yr|/dt per unit time of the magnitude of the yaw rate and the electric-assist-motor temperature Temp. In this case, the third device has stored in advance in the ROM a lookup table that defines a relationship among the increase amount d|Yr|/dt per unit time of the magnitude of the yaw rate, the electric-assist-motor temperature Temp, and the threshold yaw rate Yrth.

Further, the CPU of the ECU 70 may be configured to acquire the lateral acceleration Gy at Step 1105B (not shown), which replaces Step 1105 of FIG. 12, and determine whether the magnitude |Gy| of the lateral acceleration is equal to or more than the threshold lateral acceleration Gyth (d|Gy|/dt, Temp) at Step 815F (not shown), which replaces Step 815D of FIG. 12. The threshold lateral acceleration Gyth is a function of the increase amount d|Gy|/dt per unit time of the magnitude of the lateral acceleration and the electric-assist-motor temperature Temp. In this case, the third device has stored in advance in the ROM a lookup table that defines a relationship among the increase amount d|Gy|/dt per unit time of the magnitude of the lateral acceleration, the electric-assist-motor temperature Temp, and the threshold lateral acceleration Gyth.

As described above, the third device sets the threshold indication amount based on the increase amount per unit time of the steering speed indication amount so that the threshold indication amount decreases as the increase amount increases. With this configuration, the assist only by the electric assist motor 44 is carried out as much as possible for "the gentle steering", and an assist torque is generated by the hydraulic actuator 55 in the early stage for "the quick steering". In this way, the following property for the required assist torque is secured.

Fourth Embodiment

Next, a description is given of a power steering device (hereinafter also referred to as "fourth device") according to a fourth embodiment of the present invention. The fourth device is different from the first to third devices in that, at a time point at which the steering is started by the driver, the fourth device carries out control in consideration of a state in which an effect of the assist by the EHPS 50 carried out immediately before as a result of the operation on the steering wheel 11, namely, a state in which the second assist torque Ta2 remains. In the following, a description is mainly given of this point.

Figure 14:
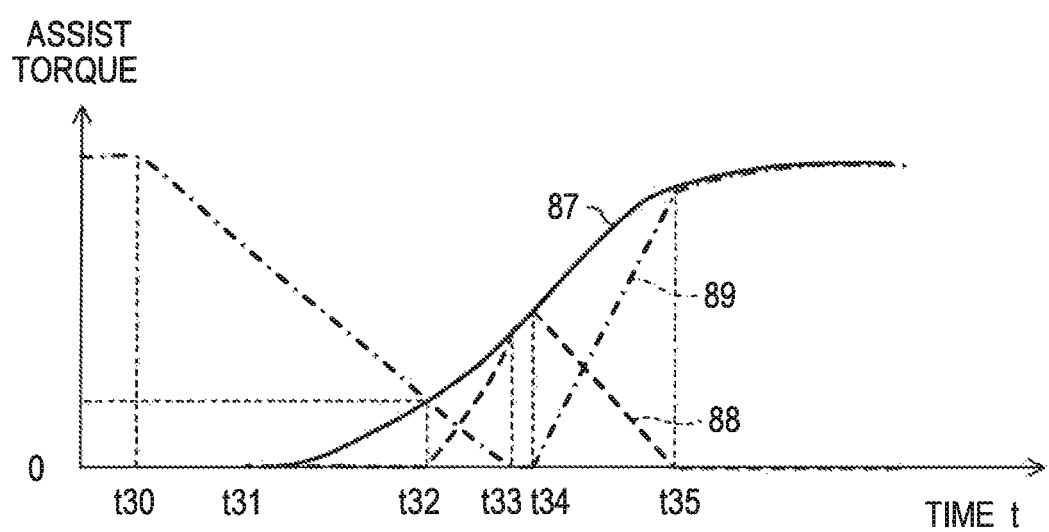
FIG. 14 is a graph for showing a temporal change in the assist torque for explaining an operation of a power steering device (fourth device) according to a fourth embodiment of the present invention.

FIG. 14 is a graph for showing a temporal change in the assist torque for describing the operation of the fourth device. First, when it is assumed that the previous steering is finished, and the electric motor 54 configured to drive the hydraulic pump 53 is stopped at a time point t30, the hydraulic pressure slowly decreases from the time point t30. In this case, as indicated as a one dot chain line 89, an amount (hereinafter also referred to as "residual torque Ta2r") corresponding to the torque generated in the hydraulic circuit slowly decreases from the time point t30.

When the steering is started again by the driver at a time point t31 (first time point), the second torsion bar 51 is twisted by the steering, and the flow passage for the hydraulic fluid is formed from the hydraulic pump 53 to the power cylinder 55. When the flow passage for the hydraulic fluid is formed, the hydraulic pressure is generated in the hydraulic circuit. Thus, the hydraulic fluid is supplied to the power cylinder 55, and the residual torque Ta2r is transmitted to the shaft part 31.

Meanwhile, as indicated as a solid line 87 of FIG. 14, the required assist torque Ta* gradually increases after the time point t31, and corresponds to (crosses) the decreasing residual torque Ta2r at a time point t32. Thus, the residual torque Ta2r is less than the required assist torque Ta* after the time point t32. Thus, the fourth device starts the assist (generates the assist torque) by the EPS 40 from the time point t32, to thereby supplement an insufficient amount of the residual torque Ta2r. In other words, the fourth device does not carry out the assist by the EPS 40 (does not generate the first assist torque Ta1) from the time point t31 to the time point t32. The first required assist torque Ta1* indicated as a broken line 88 is calculated as a value obtained by subtracting the residual torque Ta2r from the required assist torque Ta* after the time point t32, and is output.

Figure 15:
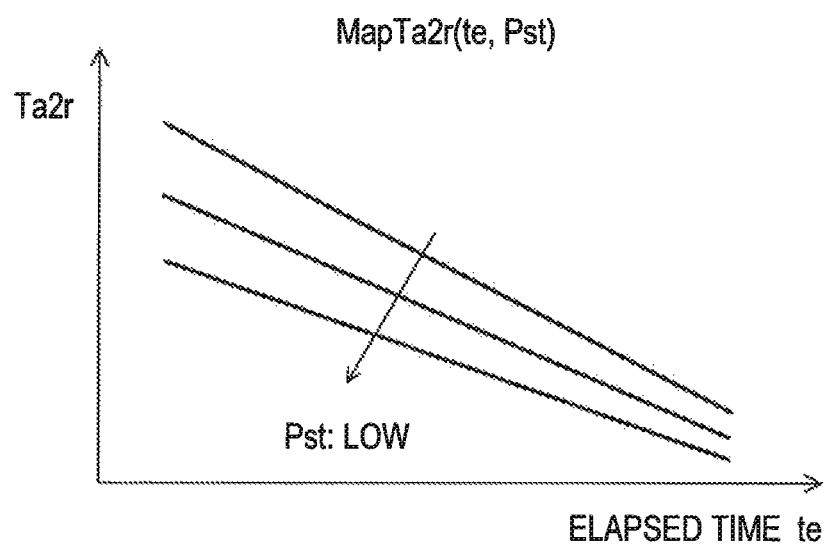
FIG. 15 is a graph for explaining a relationship between an increase amount per unit time of a magnitude of a lateral acceleration and a threshold lateral acceleration set in the second device.

The residual torque Ta2r is obtained in advance through an experiment or the like. For example, the residual torque Ta2r is stored in the ROM of the fourth device as a lookup table that defines a relationship among an elapsed period te after the second electric motor 54 is stopped, a hydraulic pressure Pst in the discharge port 53b immediately after the second electric motor 54 is stopped, and the residual torque Ta2r. As shown in FIG. 15, in this lookup table MapTa2r (te, Pst), the residual torque Ta2r is set so as to decrease as the elapsed period te increases, and so as to decrease as the hydraulic pressure Pst decreases. The fourth device applies the actual elapsed period te and hydraulic pressure Pst to the lookup table MapTa2r (te, Pst), to thereby calculate the residual torque Ta2r.

The residual torque Ta2r becomes "0" at a time point t33. Thus, the first required assist torque Ta1* corresponds to the required assist torque Ta*. The fourth device starts the drive of the second electric motor 54 at a time point t34, and the operation of the hydraulic pump 53 is thus started. The second assist torque Ta2 increases from the time point t34, and corresponds to the required assist torque Ta* at a time point t35. In contrast, the first required assist torque Ta1* starts decreasing from the time point t34 as the second assist torque Ta2 increases. In other words, the fourth device decreases the first required assist torque Ta1* so that a sum of the first required assist torque Ta1* and the second assist torque Ta2 is maintained at the required assist torque Ta*.

With this configuration, even when the assist force (residual torque Ta2r) generated by the steering immediately before exists in the hydraulic circuit at a time when the steering is started by the driver, the steering assist by the EPS 40 can be prevented from being excessive. Thus, even in this case, the driver is prevented from feeling a sense of discomfort.

Modification Examples

The present invention is not limited to the embodiments described above, and various modifications can be adopted within the scope of the present invention as described below.

The first device 10 is configured to change the duty ratio D1 of the drive current pulse to change the effective drive current of the electric motor, to thereby change the output of the electric motor (in other words, carry out the PWM control), but may be configured to change an amplitude of a DC current value of the electric motor, to thereby change the output of the electric motor.

Figure 16:
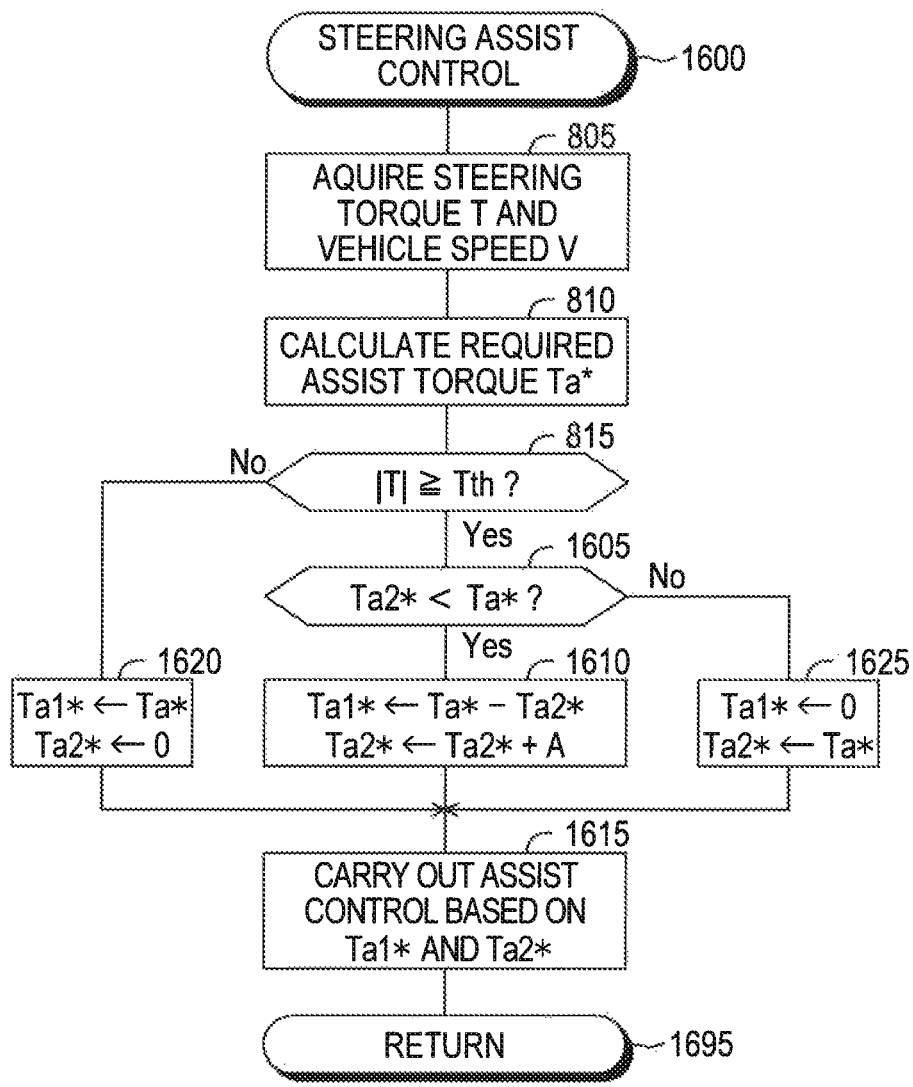
FIG. 16 is a flowchart for illustrating "a steering assist control routine" executed by a CPU of an ECU of a modification example of the first device.

The first device 10 is a device in which the EHPS 50 is configured to change the flow passages and the torque by twisting of the torsion bar, but the electric/hydraulic power steering device may be a device in which the ECU 70 changes a rotation speed (namely, a discharge pressure of the pump) of the second electric motor 54 and a rotation direction (namely, a direction of the pressure generated by the hydraulic pump) of the second electric motor 54, Referring to FIG. 16, a description is now given of a specific operation of a modification example of the first device, in which such an electric/hydraulic power steering device is used.

(1) Case in which the Magnitude |T| of the Steering Torque is Equal to or Higher than the Threshold Steering Torque Tth The CPU starts the processing from Step 1600, and proceeds to Step 815. Based on the above-mentioned assumption, the magnitude |T| of the steering torque is equal to or higher than the threshold steering torque Tth. Thus, the CPU makes a "Yes" determination at Step 815 to proceed to Step 1605. When a second required assist torque Ta2* is lower than the required assist torque Ta* (a period from the time point t11 to the time point t12 of FIG. 7), the CPU makes a "Yes" determination at Step 1605 to proceed to Step 1610, at which the CPU sets the first required assist torque Ta1* to the value obtained by subtracting the second required assist torque Ta2* from the required assist torque Ta*, and increases the second required assist torque Ta2* by a predetermined amount A. This predetermined amount A is a value corresponding to assist performance of the EHPS 50, and, for example, if a motor having a higher rating (a higher torque that can be generated) is used as the second electric motor 54, the predetermined amount A can be increased.

In this way, the sum of the first required assist torque Ta1* and the second required assist torque Ta2* corresponds to the required assist torque Ta*. In other words, the required assist torque Ta* is divided into the first required assist torque Ta1* and the second required assist torque Ta2*.

Subsequently, the CPU proceeds to Step 1615 to carry out the steering assist control based on the first required assist torque Ta1* and the second required assist torque Ta2* set at Step 1610. At Step 1615, the first required assist torque Ta1* and the second required assist torque Ta2* are converted to current values in order to drive the electric assist motor 44 and the second electric motor 54. Subsequently, the CPU proceeds to Step 1695 to tentatively terminate the present routine.

Meanwhile, when the second required assist torque Ta2* corresponds to the required assist torque Ta* (after the time point t12 of FIG. 7), the CPU makes a "No" determination at Step 1605 to proceed to Step 1625. The CPU sets the first required assist torque Ta1* to "0", and sets the second required assist torque Ta2* to the required assist torque Ta*, respectively, and proceeds to Step 1615. The CPU carries out the steering assist control based on the first required assist torque Ta1* and the second required assist torque Ta2* set at Step 1615, and proceeds to Step 1695 to tentatively terminate the present routine.

(2) Case in which the Magnitude |T| of the Steering Torque is Lower than the Threshold Steering Torque Tth When the magnitude |T| of the steering torque is lower than the threshold steering torque Tth, the CPU makes a "No" determination at Step 815 to proceed to Step 1620, at which the CPU sets the first required assist torque Ta1* to the required assist torque Ta* and the second required assist torque Ta2* to "0". Subsequently, the CPU proceeds to Step 1615 to carry out the steering assist control based on the set first required assist torque Ta1* and second required assist torque Ta2*, and proceeds to Step 1695 to tentatively terminate the present routine.

What is claimed is:
1. A power steering device, comprising:
a steering mechanism, which includes a steering wheel and a steering shaft coupled to the steering wheel, and is configured to steer steered wheels of a vehicle in response to an operation on the steering wheel by a driver of the vehicle;
a first steering assist mechanism, which includes a first electric motor assembled to the steering mechanism so as to be capable of transmitting a torque to the steering mechanism, and is configured to apply a first assist force for assisting steering of the steered wheels based on the operation on the steering wheel to the steering mechanism through the first electric motor;
a second steering assist mechanism, which includes a hydraulic pump configured to discharge hydraulic fluid when being driven, a second electric motor configured to drive the hydraulic pump, and a hydraulic actuator configured to operate through the hydraulic fluid discharged from the hydraulic pump, and is configured to apply a second assist force for assisting the steering of the steered wheels based on the operation on the steering wheel to the steering mechanism through the hydraulic actuator; and a control unit configured to determine a required assist force based on the operation on the steering wheel, and to control the first electric motor and the second electric motor so that a resultant force of the first assist force and the second assist force corresponds to the required assist force, wherein the control unit is configured to:
   stop drive of the first electric motor and stop drive of the second electric motor when the required assist force is zero;
   drive the first electric motor so that the first assist force corresponds to the required assist force with the drive of the second electric motor being stopped in a period from a first time point at which a magnitude of the required assist force starts increasing from zero to a second time point at which a predetermined specific condition is determined to be satisfied; and
   start the drive of the second electric motor at the second time point to increase the second assist force as time elapses, estimate the second assist torque in accordance with an elapsed time period from the second time point, and drive the first electric motor after the second time point so that the first assist force corresponds to a value obtained by subtracting the estimated second assist force from the required assist force to decrease the first assist force as time elapses.

2. A power steering device according to claim 1, wherein the control unit is configured to determine that the predetermined specific condition is satisfied when a magnitude of a steering torque generated in the steering shaft by the operation on the steering wheel changes from a magnitude lower than a threshold steering torque to a magnitude equal to or higher than the threshold steering torque.

3. A power steering device according to claim 1, wherein the control unit is configured to determine that the predetermined specific condition is satisfied when a steering speed indication amount, which is one of a magnitude of a steering speed being a rotational speed of the steering wheel, a magnitude of a yaw rate of the vehicle, and a magnitude of a lateral acceleration of the vehicle, changes from an amount less than a predetermined threshold indication amount to an amount equal to or more than the predetermined threshold indication amount.

4. A power steering device according to claim 3, wherein the control unit is configured to set the predetermined threshold indication amount based on an increase amount per unit time of the steering speed indication amount so that the predetermined threshold indication amount decreases as the increase amount increases.

5. A power steering device according to claim 3, wherein the control unit is configured to set the predetermined threshold indication amount in accordance with a temperature of the first electric motor so that the predetermined threshold indication amount decreases as the temperature of the first electric motor increases.

6. A power steering device according to claim 3,
   wherein the control unit includes a driving circuit including a semiconductor device configured to control an amount of current supply to the first electric motor, and
   wherein the control unit is configured to set the predetermined threshold indication amount in accordance with a temperature of the semiconductor device so that the predetermined threshold indication amount decreases as the temperature of the semiconductor device increases.

* * * * *